(12) United States Patent
Whitaker et al.

(10) Patent No.: US 11,230,929 B2
(45) Date of Patent: Jan. 25, 2022

(54) TURBINE COMPONENT WITH DUST TOLERANT COOLING SYSTEM

(71) Applicant: HONEYWELL INTERNATIONAL INC., Morris Plains, NJ (US)

(72) Inventors: Steven Whitaker, Phoenix, AZ (US); Daniel Crites, Mesa, AZ (US); Vighneswara Kollati, Hyderabad (IN); Mark Morris, Phoenix, AZ (US); Benjamin Dosland Kamrath, Mesa, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 58 days.

(21) Appl. No.: 16/674,527

(22) Filed: Nov. 5, 2019

(65) Prior Publication Data
US 2021/0131289 A1  May 6, 2021

(51) Int. Cl.
*F01D 5/18* (2006.01)
*F01D 9/04* (2006.01)

(52) U.S. Cl.
CPC ............. *F01D 5/186* (2013.01); *F01D 5/187* (2013.01); *F01D 9/041* (2013.01); *F05D 2220/323* (2013.01); *F05D 2240/121* (2013.01); *F05D 2240/303* (2013.01); *F05D 2260/202* (2013.01);
(Continued)

(58) Field of Classification Search
CPC .......... F01D 5/186; F01D 5/187; F01D 9/041; F01D 9/065; F01D 11/04; F05D 2220/323; F05D 2240/121; F05D 2240/122; F05D 2240/303; F05D 2250/27; F05D 2250/712; F05D 2260/202; F05D 2260/205;
(Continued)

(56) References Cited

U.S. PATENT DOCUMENTS

| 4,180,373 A | 12/1979 | Moore et al. |
| 4,183,716 A | 1/1980 | Takahara et al. |
| 4,257,737 A | 3/1981 | Andress et al. |

(Continued)

FOREIGN PATENT DOCUMENTS

| EP | 3112593 A1 | 1/2017 |
| EP | 1882817 B1 | 2/2017 |

OTHER PUBLICATIONS

Nabati, Hamid, et al., "Optimal Pin Fin Heat Exchanger Surface," Malardalen University Press Licentiate Theses No. 88, 2008.
(Continued)

*Primary Examiner* — Courtney D Heinle
*Assistant Examiner* — Danielle M. Christensen
(74) *Attorney, Agent, or Firm* — Lorenz & Kopf, LLP

(57) ABSTRACT

A turbine component includes a hot wall, a cold wall spaced apart from the hot wall and a conduit defined between the hot wall and the cold wall. A cooling system is defined in the conduit. The cooling system includes a plurality of cooling pins, each including a first end having a first cross-sectional area and a second end having a second cross-sectional area. Each cooling pin includes a body extending between the first end and the second end, with a pin leading edge defined along the body from the first end to the second end. The pin leading edge is defined by a first diameter and a pin trailing edge is defined by a second diameter. At least one first cooling pin has the first end coupled to the hot wall and the second end coupled to the cold wall with a fillet.

13 Claims, 18 Drawing Sheets

(52) U.S. Cl.
CPC ............... *F05D 2260/2212* (2013.01); *F05D 2260/2214* (2013.01); *F05D 2260/22141* (2013.01)

(58) Field of Classification Search
CPC ..... F05D 2260/2212; F05D 2260/2214; F05D 2260/22141
See application file for complete search history.

(56) References Cited

U.S. PATENT DOCUMENTS

| | | | |
|---|---|---|---|
| 4,474,532 | A | 10/1984 | Pazder |
| 5,100,293 | A | 3/1992 | Anzai et al. |
| 5,356,265 | A | 10/1994 | Kercher |
| 5,634,766 | A | 6/1997 | Cunha et al. |
| 5,669,759 | A | 9/1997 | Beabout |
| 5,772,397 | A | 6/1998 | Morris et al. |
| 5,931,638 | A | 8/1999 | Krause et al. |
| 5,997,245 | A | 12/1999 | Tomita et al. |
| 6,132,169 | A | 10/2000 | Manning et al. |
| 6,431,832 | B1 | 8/2002 | Glezer et al. |
| 6,974,308 | B2 | 12/2005 | Halfmann et al. |
| 7,018,176 | B2 | 3/2006 | Mongillo et al. |
| 7,195,458 | B2 | 3/2007 | Liang |
| 7,281,895 | B2 | 10/2007 | Liang |
| 7,568,887 | B1 | 8/2009 | Liang |
| 7,862,299 | B1 | 1/2011 | Liang |
| 7,914,257 | B1 | 3/2011 | Liang |
| 7,963,745 | B1 | 6/2011 | Liang |
| 8,070,443 | B1 | 12/2011 | Liang |
| 8,215,909 | B2 | 7/2012 | Grob |
| 8,292,581 | B2 | 10/2012 | Poon et al. |
| 8,628,294 | B1 | 1/2014 | Liang |
| 8,770,920 | B2 | 7/2014 | Naik et al. |
| 8,858,159 | B2 | 10/2014 | Piggush et al. |
| 8,864,469 | B1 | 10/2014 | Liang |
| 8,920,124 | B2 | 12/2014 | Lee |
| 9,267,381 | B2 | 2/2016 | Morris et al. |
| 9,297,261 | B2 * | 3/2016 | Otero ............... F01D 5/187 |
| 9,938,836 | B2 | 4/2018 | Weber et al. |
| 10,006,368 | B2 | 6/2018 | Horiuchi et al. |
| 10,563,520 | B2 * | 2/2020 | Kamrath ............... F01D 5/187 |
| 10,669,862 | B2 * | 6/2020 | Tapia ............... F01D 5/188 |
| 2004/0208744 | A1 | 10/2004 | Langley et al. |
| 2007/0253816 | A1 | 11/2007 | Walz et al. |
| 2010/0054952 | A1 | 3/2010 | Gross |
| 2010/0239431 | A1 | 9/2010 | Liang |
| 2012/0076660 | A1 | 3/2012 | Spangler et al. |
| 2014/0130354 | A1 | 5/2014 | Pal et al. |
| 2016/0069191 | A1 | 3/2016 | Lutjen |
| 2016/0341046 | A1 | 11/2016 | Feldmann et al. |
| 2017/0009589 | A1 | 1/2017 | Gupta et al. |
| 2017/0107829 | A1 | 4/2017 | Krumanaker et al. |
| 2017/0211392 | A1 | 7/2017 | Lutjen et al. |
| 2018/0163545 | A1 | 6/2018 | Bang |
| 2018/0283182 | A1 | 10/2018 | Kamrath et al. |

OTHER PUBLICATIONS

Femandes, Royce, "Investigation of Pin Fin Cooling Channels for Applications in Gas Turbines," A Thesis Submitted to the Faculty of Embry-Riddle Aeronautical University,, May 2016.

Cohen, J. and Bourell, D.L., "Development of Novel Tapered Pin Fin Geometries for Additive Manufacturing of Compact Heat Exchangers," Proc. of the 27th Annual International Solid Freeform Fabrication Symposium, Nov. 2016, pp. 2314-2336.

* cited by examiner

TURBINE COMPONENT WITH DUST TOLERANT COOLING SYSTEM

TECHNICAL FIELD

The present disclosure generally relates to gas turbine engines, and more particularly relates to a turbine component having a dust tolerant cooling system associated with a turbine of the gas turbine engine.

BACKGROUND

Gas turbine engines may be employed to power various devices. For example, a gas turbine engine may be employed to power a mobile platform, such as an aircraft. Gas turbine engines employ a combustion chamber upstream from one or more turbines, and as high temperature gases from the combustion chamber are directed into these turbines these high temperature gases contact downstream airfoils, such as the airfoils of a turbine vane or turbine blade. Typically, the leading edge of these airfoils experiences the full effect of the high temperature gases, which may increase the risk of oxidation of the leading edge. As higher turbine inlet temperature and higher turbine engine speed are required to improve gas turbine engine efficiency, additional cooling of the leading edge of these airfoils is needed to reduce a risk of oxidation of these airfoils associated with the gas turbine engine.

Further, in the example of the gas turbine engine powering a mobile platform, certain operating environments, such as desert operating environments, may cause the gas turbine engine to ingest fine sand and dust particles. These ingested fine sand and dust particles may pass through portions of the gas turbine engine and may accumulate in stagnation regions of cooling circuits within turbine components, such as the airfoils of the turbine vane and/or the airfoils of the turbine blade. The accumulation of the fine sand and dust particles in the stagnation regions of the cooling circuits in the turbine components, such as these airfoils, may impede the cooling of these airfoils, which in turn, may reduce the life of these airfoils leading to increased repair costs and downtime for the gas turbine engine.

Accordingly, it is desirable to provide improved cooling for an airfoil of a turbine component, such as a turbine vane or turbine blade, with a dust tolerant cooling system that reduces the accumulation of fine sand and dust particles within the airfoil during cooling of the airfoil. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a turbine component. The turbine component includes a hot wall and a cold wall spaced apart from the hot wall. The turbine component also includes a conduit defined between the hot wall and the cold wall and a cooling system defined in the conduit between the hot wall and the cold wall. The cooling system includes a plurality of cooling pins, with each cooling pin of the plurality of cooling pins including a first end having a first cross-sectional area and a second end having a second cross-sectional area. The first cross-sectional area is less than the second cross-sectional area. Each cooling pin includes a body extending between the first end and the second end, with a pin leading edge defined along the body from the first end to the second end, and the pin leading edge is opposite a pin trailing edge. The pin leading edge is defined by a first diameter and the pin trailing edge is defined by a second diameter. The second diameter greater is than the first diameter, and at least one first cooling pin of the plurality of cooling pins having the first end coupled to the hot wall and the second end coupled to the cold wall with a fillet.

The turbine component has a pressure side opposite a suction side, a rib that extends between the pressure side and the suction side and the cold wall is defined by the rib. At least one second pin of the plurality of cooling pins has the second end coupled to the hot wall with the fillet and the first end coupled to the cold wall. Each of the plurality of cooling pins has the first end coupled to the hot wall and the second end coupled to the cold wall with the fillet. The fillet further includes a first fillet defined along the leading edge and a second fillet defined along the trailing edge, and the first fillet is greater than the second fillet. The turbine component includes an airfoil that extends from an inner diameter to an outer diameter and from a leading edge to a trailing edge, with an inner platform coupled to the airfoil at the inner diameter, the conduit is in proximity to the leading edge to cool the leading edge, the conduit having an inlet at the outer diameter to receive a cooling fluid and an outlet portion that is defined at least partially through the inner platform, the hot wall of the conduit opposite the leading edge, and the cooling system further includes a second conduit to cool the trailing edge. The outlet portion includes at least one outlet in fluid communication with the second conduit. The outlet portion is in fluid communication with a plurality of film cooling holes defined through a portion of the inner platform that spans between the airfoil and a second airfoil, the second airfoil coupled to the inner platform and spaced apart from the airfoil. Downstream from the inner platform, the outlet portion is defined through a portion of the airfoil such that the outlet portion is in fluid communication with the trailing edge. The plurality of cooling pins includes a first pair of the plurality of cooling pins extending substantially along a first longitudinal axis and having the first end coupled to the hot wall and the second end coupled to the cold wall, and a second pair of the plurality of cooling pins having a third end coupled to the hot wall and a fourth end coupled to the cold wall such that the fourth end is offset from an axis that extends through the third end of the second pair of the plurality of cooling pins and the third end has a greater cross-sectional area than the fourth end. The cooling system further includes a rib that extends from the hot wall to the cold wall to divide the conduit into a plurality of flow passages.

Also provided is a cooling system for a turbine component. The turbine component has a pressure side opposite a suction side and defines a conduit, with the cooling system defined in the conduit. The cooling system includes a plurality of cooling pins including a first end having a first cross-sectional area and a second end having a second cross-sectional area. The second cross-sectional area is greater than the first cross-sectional area. Each cooling pin has a body extending between the first end and the second end, with a pin leading edge defined along the body from the first end to the second end, and the pin leading edge is opposite a pin trailing edge. The pin leading edge is defined by a first diameter and the pin trailing edge is defined by a second diameter. The second diameter is greater than the first diameter. Each of the plurality of cooling pins has the first end coupled to one of the suction side and the pressure side and the second end coupled to the other of the suction side and the pressure side with a fillet, the plurality of cooling pins promoting heat transfer between the pressure side and the suction side.

The plurality of cooling pins further includes at least one first cooling pin of the plurality of cooling pins having the first end coupled to the pressure side and the second end coupled to the suction side with the fillet. The plurality of cooling pins further includes at least one second cooling pin having the first end coupled to the suction side and the second end coupled to the pressure side with the fillet. Each of the plurality of cooling pins has the first end coupled to the pressure side and the second end coupled to the suction side with the fillet. Each of the plurality of cooling pins is coupled to the pressure side and the suction side such that the leading edge is upstream from the trailing edge. The turbine component is a turbine blade having an airfoil with a leading edge and a trailing edge, and the conduit is defined proximate the trailing edge. The fillet further includes a first fillet defined along the leading edge and a second fillet defined along the trailing edge, and the first fillet is greater than the second fillet.

Further provided is a turbine component. The turbine component includes an airfoil having a pressure side opposite a suction side and a rib that extends between the pressure side and the suction side. The turbine component includes a hot wall, a cold wall spaced apart from the hot wall defined by the rib and a conduit defined in the airfoil between the hot wall and the cold wall. The turbine component includes a cooling system defined in the conduit between the hot wall and the cold wall. The cooling system including a plurality of cooling pins, each cooling pin of the plurality of cooling pins including a first end having a first cross-sectional area, a second end having a second cross-sectional area, and the first cross-sectional area is less than the second cross-sectional area. Each cooling pin has a body extending between the first end and the second end, with a pin leading edge defined along the body from the first end to the second end, the pin leading edge opposite a pin trailing edge, and the pin leading edge is defined by a first diameter and the pin trailing edge is defined by a second diameter. The second diameter is greater than the first diameter. At least one first cooling pin of the plurality of cooling pins has the first end coupled to the hot wall and the second end coupled to the cold wall with a fillet.

At least one second pin of the plurality of cooling pins has the second end coupled to the hot wall with the fillet and the first end coupled to the cold wall.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
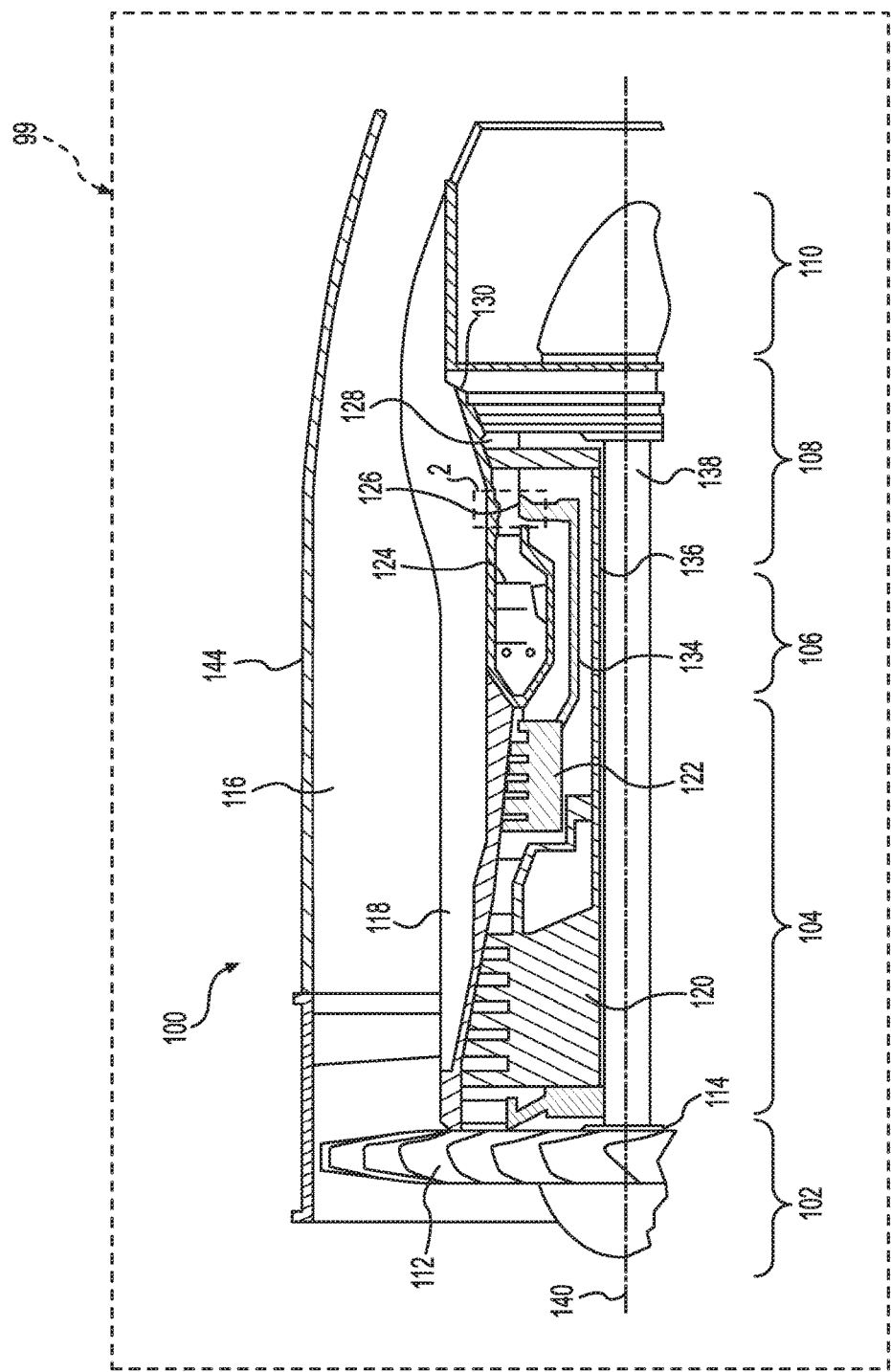
FIG. 1 is a schematic cross-sectional illustration of a gas turbine engine, which includes an exemplary turbine vane and turbine blade, each including a dust tolerant cooling system in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from increased cooling via a dust tolerant cooling system, and that the airfoil described herein for use with a turbine component, such as a turbine vane or turbine blade of a gas turbine engine, is merely one exemplary embodiment according to the present disclosure. Moreover, while the turbine component including the dust tolerant cooling system is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel. Also as used herein, the terms "integrally formed" and "integral" mean one-piece and exclude brazing, fasteners, or the like for maintaining portions thereof in a fixed relationship as a single unit.

With reference to FIG. 1, a partial, cross-sectional view of an exemplary gas turbine engine 100 is shown with the remaining portion of the gas turbine engine 100 being axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. As will be discussed herein, with brief reference to FIG. 2, the gas turbine engine 100 includes a turbine component, such as a turbine vane 208, that has a dust tolerant cooling system 202 for providing improved cooling of a leading edge 204 of an airfoil 200. In one example, the airfoil 200 is incorporated into the turbine vane 208 and by providing the airfoil 200 with the dust tolerant cooling system 202, the cooling of the leading edge 204 of the airfoil 200 is increased by convective heat transfer between the dust tolerant cooling system 202 and a low temperature cooling fluid F received into the turbine vane 208. The dust tolerant cooling system 202 improves cooling of the leading edge 204 of the airfoil 200 associated with the turbine vane 208 by providing improved convective heat transfer between the leading edge 204 and the cooling fluid F, which reduces a risk of oxidation of the airfoil 200, while also reducing an accumulation of dust and fine particles within the dust tolerant cooling system 202. It should be noted that while a turbine vane is shown herein as employing the airfoil 200 with the dust tolerant cooling system 202, a turbine blade may also include the airfoil 200 with the dust tolerant cooling system 202, if desired.

In this example, with reference back to FIG. 1, the gas turbine engine 100 includes fan section 102, a compressor section 104, a combustor section 106, a turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 118 and an outer casing 144. In the embodiment of FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine components, such as the turbine vane 208 and turbine blades (rotor blade structure 1004 of FIG. 13), in the turbine section 108.

In the embodiment of FIG. 1, in the combustor section 106, which includes a combustion chamber 124, the high pressure air is mixed with fuel, which is combusted. The high-temperature combustion air is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
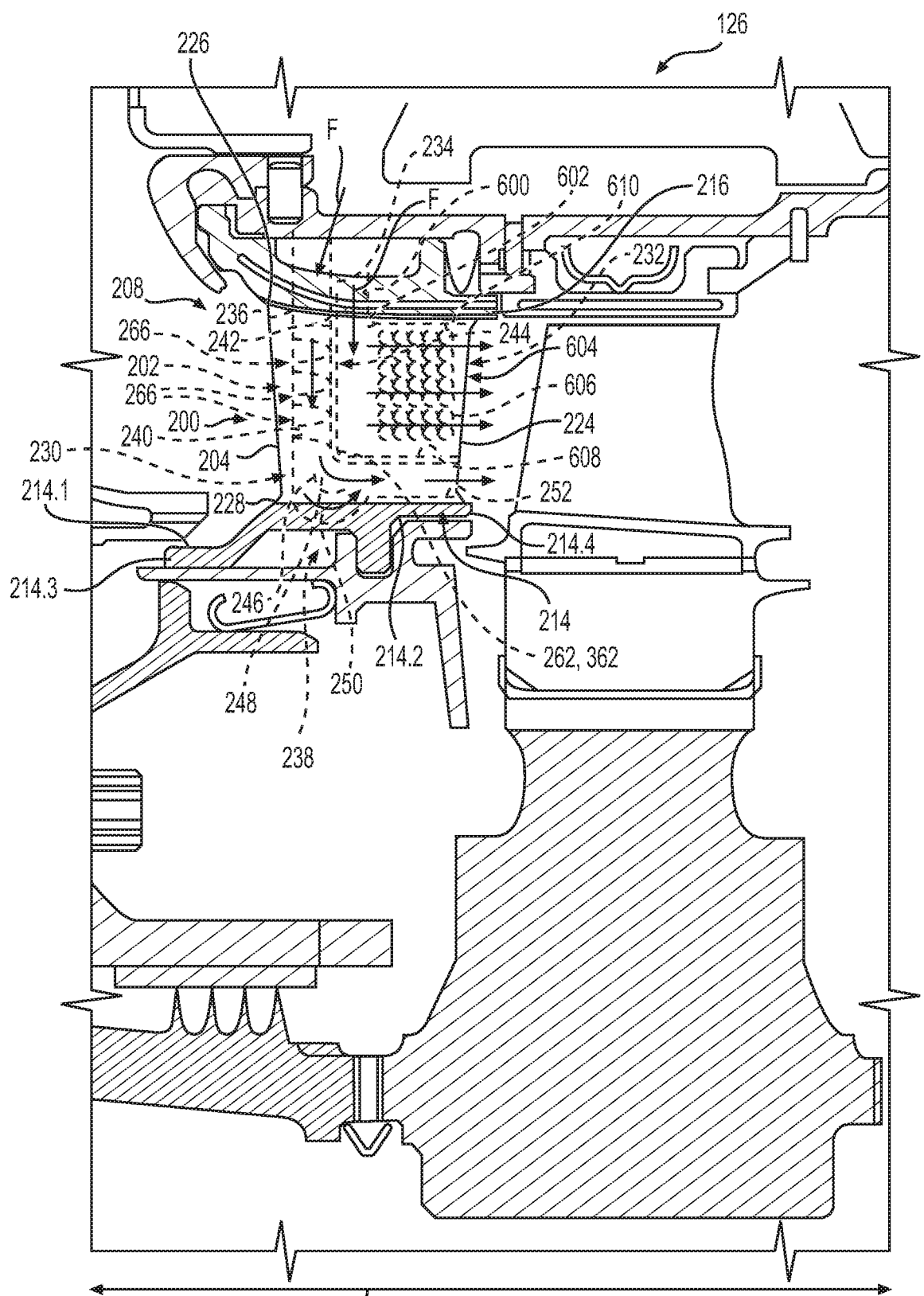
FIG. 2 is a detail cross-sectional view of the gas turbine engine of FIG. 1, taken at 2 of FIG. 1, which illustrates the turbine vane that includes the dust tolerant cooling system that is configured to cool a leading edge of an airfoil of the turbine vane while reducing the accumulation of fine sand and dust particles within the airfoil.

With reference to FIG. 2, a portion of the high pressure turbine 126 of the gas turbine engine 100 of FIG. 1 is shown in greater detail. In this example, the dust tolerant cooling system 202 is employed with airfoils 200 associated with the turbine vane 208. As discussed, the dust tolerant cooling system 202 provides for improved cooling for the respective leading edges 204 of the airfoils 200 by increasing heat transfer between the leading edge 204 and the cooling fluid F while reducing the accumulation of dust and fine particles.

Figure 3:
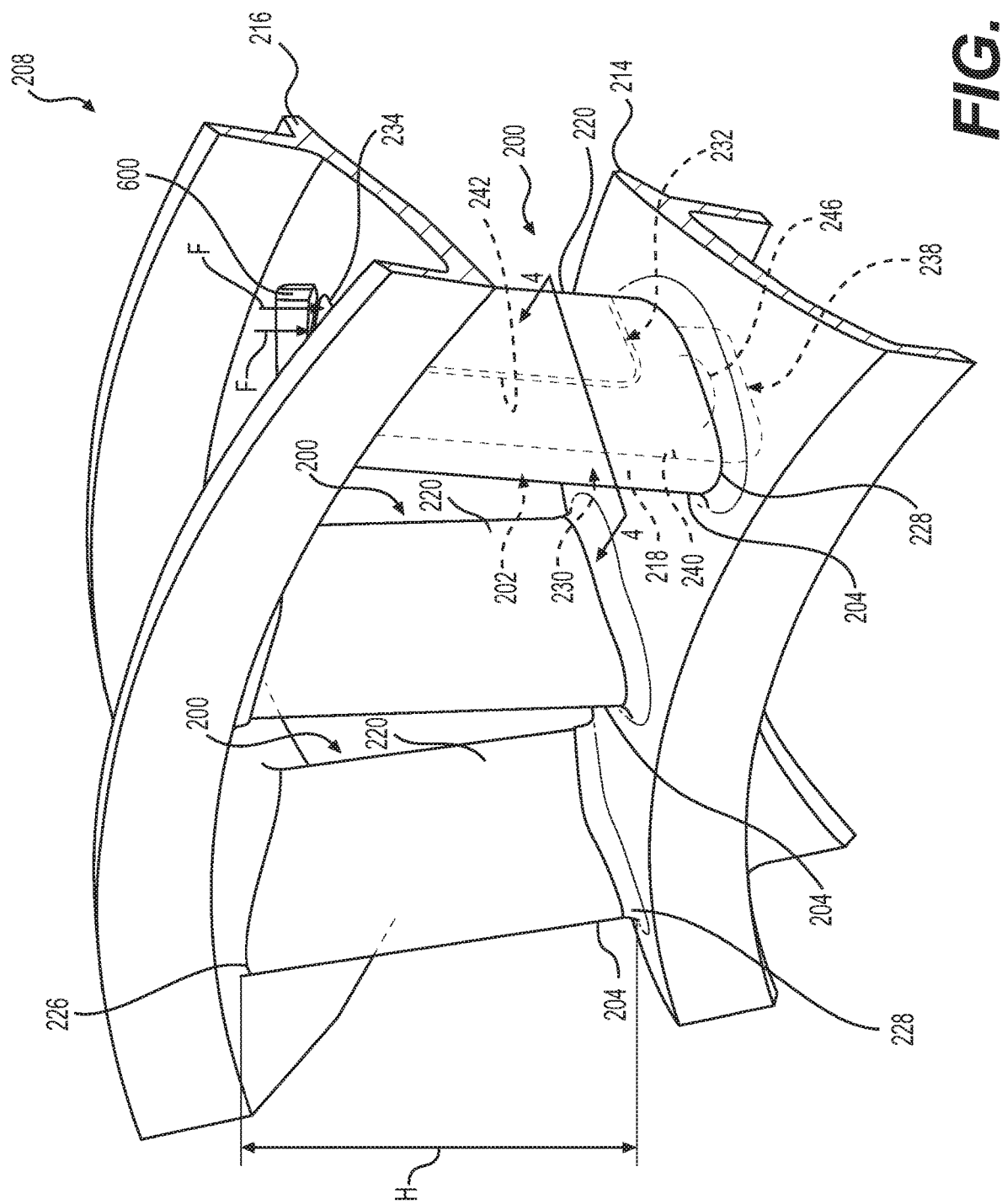
FIG. 3 is a perspective view of a portion of the turbine vane of FIG. 2, in which each airfoil of the turbine vane includes a respective dust tolerant cooling system in accordance with various embodiments.

With reference to FIG. 3, a perspective view of a portion of the turbine vane 208 is shown. In this view, three airfoils 200 associated with the turbine vane 208 are shown, however, it will be understood that the turbine vane 208 generally includes a plurality of airfoils 200, and is axisymmetric with respect to the longitudinal axis 140. The turbine vane 208 includes a pair of opposing endwalls or platforms 214, 216, and the airfoils 200 are arranged in an annular array between the pair of opposing platforms 214, 216. The platforms 214, 216 have an annular or circular main or body section. The platforms 214, 216 are positioned in a concentric relationship with the airfoils 200 disposed in the radially extending annular array between the platforms 214, 216. In this example, the platform 216 is an outer platform and the platform 214 is an inner platform. The outer platform 216 circumscribes the inner platform 214 and is spaced therefrom to define a portion of the combustion gas flow path in the gas turbine engine 100. The plurality of airfoils 200 is generally disposed in the portion of the combustion gas flow path. In one example, the inner platform 214 is coupled to each of the airfoils 200 at an inner diameter, and the outer platform 216 is coupled to each of the airfoils 200 at an outer diameter.

Each of the airfoils 200 has a generally concave pressure sidewall 218 and an opposite, generally convex suction sidewall 220. The pressure and suction sidewalls 218, 220 interconnect the leading edge 204 and a trailing edge 224 (FIG. 2) of each airfoil 200. The airfoil 200 includes a tip 226 and a root 228, which are spaced apart by a height H of the airfoil 200 or in a spanwise direction. The tip 226 is at the outer diameter of the airfoil 200 and is coupled to the outer platform 216; and the root 228 is at the inner diameter and is coupled to the inner platform 214.

In one example, for each of the airfoils 200, the dust tolerant cooling system 202 is defined through the outer platform 216 and the inner platform 214 associated with the respective one of the airfoils 200, and a portion of the dust tolerant cooling system 202 is defined between the pressure and suction sidewalls 218, 220 of the respective airfoil 200. In this example, the dust tolerant cooling system 202 includes a first, leading edge conduit or first conduit 230 and a second, trailing edge conduit or second conduit 232. The first conduit 230 is in fluid communication with a source of a cooling fluid F (FIG. 2) to cool the leading edge 204 of the airfoil 200, and the second conduit 232 is in fluid communication with the source of the cooling fluid F (FIG. 2) to cool the airfoil 200 downstream of the leading edge 204 to the trailing edge 224. Thus, the first conduit 230 is in proximity to the leading edge 204 to cool the leading edge 204, and the second conduit 232 is to cool the trailing edge 224. In one example, the source of the cooling fluid F may comprise flow from the high pressure compressor 122 (FIG. 1) exit discharge air. It should be noted, however, that the cooling fluid F may be received from other sources upstream of the turbine vane 208.

Figure 4:
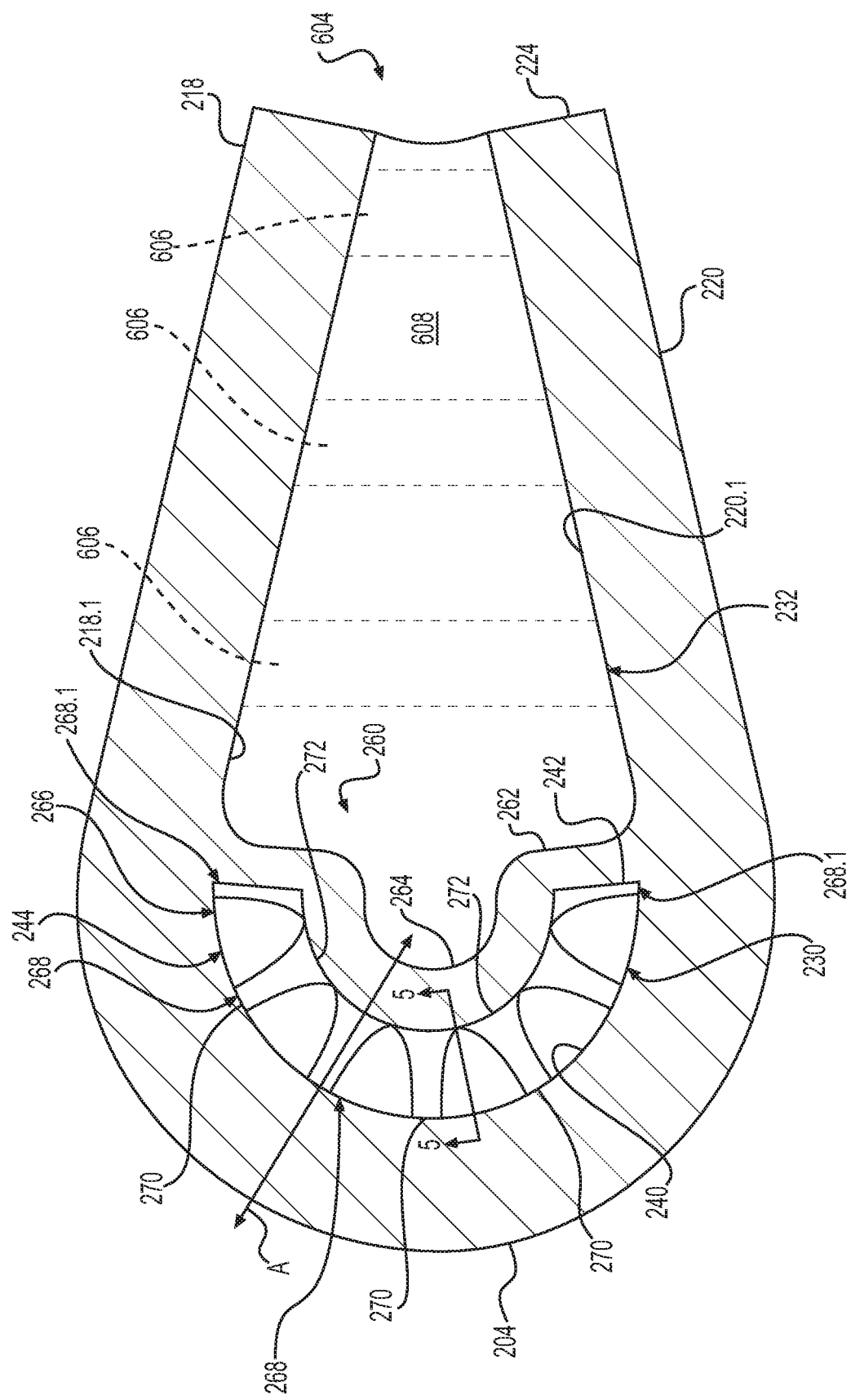
FIG. 4 is a cross-sectional view taken along line 4-4 of FIG. 3, which illustrates an exemplary plurality of cooling features associated with a first conduit of the dust tolerant cooling system in accordance with various embodiments.

In one example, the first conduit 230 includes an outer platform inlet bore 234, an airfoil inlet 236 (FIG. 2), an outlet portion 238, a first surface 240, a second surface 242 and a plurality of cooling features 244 (FIG. 4). For clarity, the plurality of cooling features 244 is not shown in FIG. 3. The outer platform inlet bore 234 is defined through the outer platform 216. The outer platform inlet bore 234 fluidly couples the source of the cooling fluid F to the airfoil inlet 236 to supply the first conduit 230 with the cooling fluid F. In other embodiments, the first conduit 230 may be fed from the inner platform 214, such that the cooling fluid F flows into the airfoil 200 at the root 228. In yet another embodiment, the second conduit 232 may also be fed from the inner platform 214, such that the cooling fluid F flows into the airfoil 200 at the root 228.

With reference to FIG. 2, the airfoil inlet 236 is defined at the tip 226 so as to be positioned at the outer diameter. Thus, the first conduit 230 has an inlet defined at the outer diameter. The airfoil inlet 236 is in fluid communication with the outer platform inlet bore 234 to receive the cooling fluid F. In one example, the outlet portion 238 is defined at least partially through the inner platform 214. In this example, the outlet portion 238 includes a turning vane or flow splitter 246. The flow splitter 246 is defined within the airfoil 200 so as to separate the flow into the outlet portion 238. The flow splitter 246 extends between the pressure and suction sidewalls 218, 220 within outlet portion 238 of the first conduit 230. The flow splitter 246 separates the outlet portion 238 into a first outlet flow path 248 and a second outlet flow path 250. Stated another way, the outlet portion 238 diverges within the airfoil 200 into at least two flow paths (the first outlet flow path 248 and the second outlet flow path 250), with one of the flow paths (the second outlet flow path 250) defined at least partially within the inner platform 214. In one example, the first outlet flow path 248 is defined so as to be contained wholly within the airfoil 200, while the second outlet flow path 250 is defined such that at least a portion of the second outlet flow path 250 is defined through a portion of the inner platform 214. Stated another way, the second outlet flow path 250 is defined through the airfoil 200 and a portion of the inner platform 214. The flow splitter 246 may have any predetermined size and shape to direct the cooling fluid F into the first outlet flow path 248 and the second outlet flow path 250.

In this regard, the inner platform 214 has a first platform surface 214.1 opposite a second platform surface 214.2, and a first platform end 214.3 opposite a second platform end 214.4. In this example, the second outlet flow path 250 is defined within the first platform surface 214.1 and spaced a distance apart from the first platform end 214.3 and the second platform end 214.4. Generally, the second outlet flow path 250 is defined as a concave recess through the first platform surface 214.1. By defining the second outlet flow path 250 through the inner platform 214, the cooling fluid F cools the inner platform 214, thereby increasing the life of the inner platform 214. The first outlet flow path 248 and the second outlet flow path 250 converge downstream from the flow splitter 246 within the airfoil 200 to define a single outlet 252 for the first conduit 230. In one example, the outlet 252 is defined to exhaust the cooling fluid F at the trailing edge 224 of the airfoil 200 near the root 228. Stated another way, the outlet 252 is in fluid communication with the trailing edge 224.

With reference to FIG. 4, the first surface 240, the second surface 242 and the plurality of cooling features 244 of the airfoil 200 are shown in greater detail. The first surface 240 and the second surface 242 cooperate to define the first conduit 230 within the airfoil 200. The first surface 240 is opposite the leading edge 204, and extends along the airfoil 200 from the tip 226 to the root 228 (FIG. 2). Thus, the first surface 240 is a first, hot wall. In one example, the airfoil 200 includes a rib 260 that separates the first conduit 230 from the second conduit 232. The rib 260 extends from an inner surface 218.1 of the pressure sidewall 218 to an inner surface 220.1 of the suction sidewall 220. The rib 260 defines the second surface 242, and includes a third surface 262 opposite the second surface 242. The second surface 242 is a second, cold wall. In this example, the rib 260 includes a concave protrusion 264, which extends toward the first surface 240. It should be noted that the concave protrusion 264 is optional, and the rib 260 need not include the concave protrusion 264. Moreover, while the concave protrusion 264 is shown to be defined along both the second surface 242 and the third surface 262, the concave protrusion 264 may be defined so as to extend outwardly along the second surface 242, such that the third surface 262 is flat or planar.

The plurality of cooling features 244 are arranged in sub-pluralities or rows 266 that are spaced apart radially relative to the longitudinal axis 140 of the gas turbine engine 10 from the root 228 to the tip 226 of the airfoil 200 (FIG. 2). Depending on the size of the turbine vane 208, the number of rows 266 of the cooling features 244 may be between about 4 to about 20. In other embodiments, the number of rows of cooling features 244 may be greater than about 20 or less than about 4. The sub-pluralities of the plurality of cooling features 244 are spaced apart radially in the rows 266 along the height H (FIG. 3) of the airfoil 200 within the first conduit 230 (FIG. 2). As shown in FIG. 4, in one example, each row 266 of the plurality of cooling features 244 includes a plurality of cooling pins 268. In this example, each row 266 includes about five cooling pins 268 and includes about two half cooling pins 268.1. The half cooling pins 268.1 comprise one-half of the cooling pin 268 cut along a central axis A of the cooling pin 268. It should be noted that instead of two half cooling pins 268.1, a single cooling pin 268 may be employed. Each of the cooling pins 268, 268.1 extends from the first surface 240 to the second surface 242 to facilitate convective heat transfer between the cooling fluid F and the leading edge 204, while reducing an accumulation of dust and fine particles. In this example, each of the half cooling pins 268.1 extends from the first surface 240 and extends along the second surface 242 of the rib 260 to facilitate heat transfer, while also reducing an accumulation of dust and fine particles.

Figure 5:
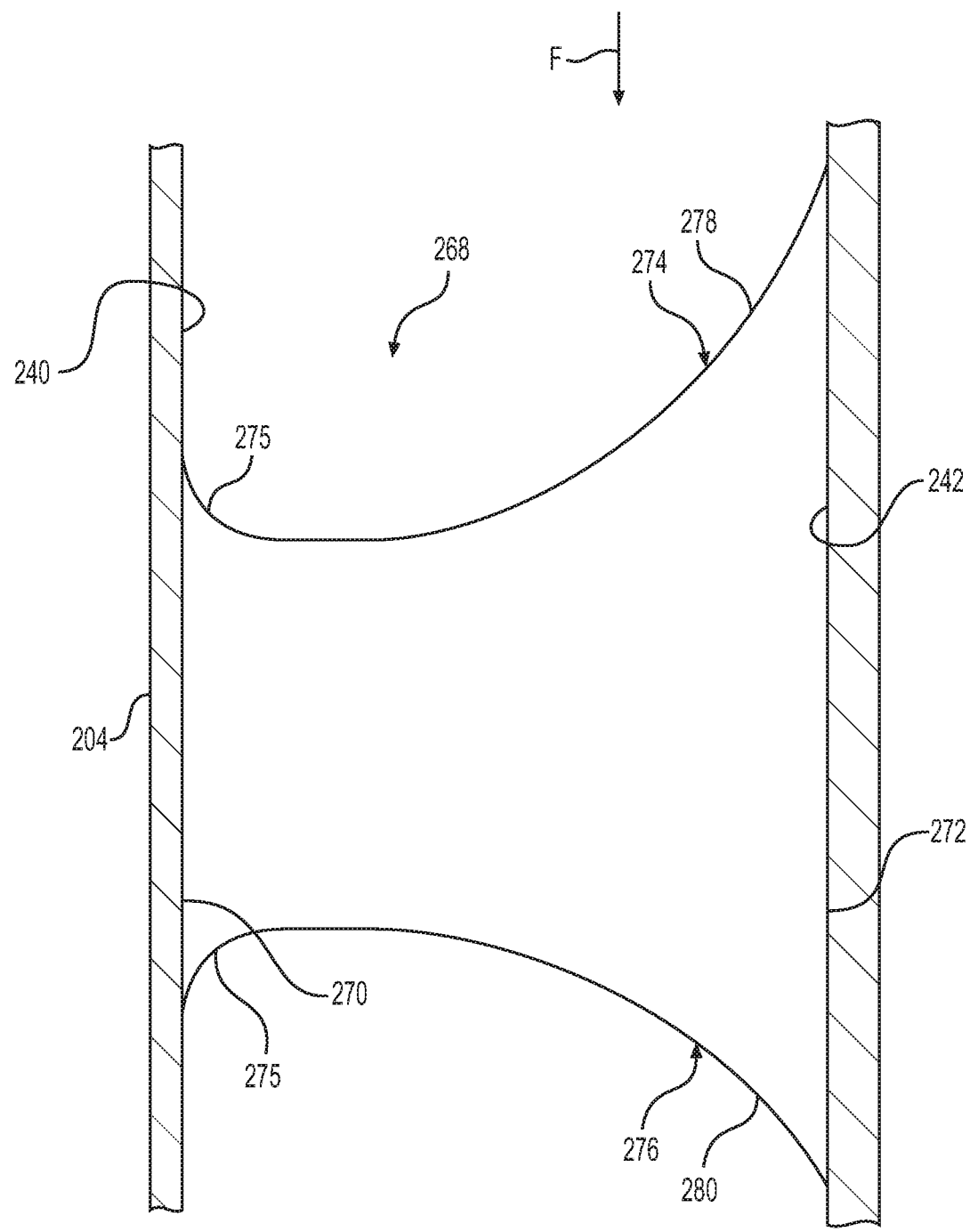
FIG. 5 is a cross-sectional view taken along line 5-5 of FIG. 4, which illustrates a side view of one of the plurality of cooling features of the first conduit of FIG. 4.

As can be appreciated, each of the cooling pins 268 are the same, and thus, only one of the cooling pins 268 will be described in detail herein. With reference to FIG. 5, each cooling pin 268 includes a first pin end 270, and an opposite second pin end 272. The first pin end 270 is coupled to or integrally formed with the first surface 240 and the second pin end 272 is coupled to or integrally formed with the second surface 242. In one example, each cooling pin 268 also includes a first fillet 274 and a second fillet 276. In this example, the first fillet 274 is defined along a first surface 278 of the cooling pin 268, while the second fillet 276 is defined along an opposite, second surface 280 of the cooling pin 268. The first fillet 274 is defined along the first surface 278 at the second pin end 272 to extend toward the first pin end 270, and has a greater fillet arc than the second fillet 276.

By providing the first fillet 274 with a larger fillet arc at the second pin end 272, vorticity in the cooling fluid F is increased and conduction from the leading edge 204 is improved as the first fillet 274 drives the cooling fluid F toward the hot wall, which in this example, is the first surface 240. The second fillet 276 is defined along the second surface 280 at the second pin end 272 to extend toward the first pin end 270. Generally, the first fillet 274 and the second fillet 276 is asymmetric orthogonal to the direction of flow of the cooling fluid F (first surface 278 versus the second surface 280; FIG. 5) and is symmetric in a plane that is aligned with the direction of flow of the cooling fluid F and the axis A1 of the cooling pin 268 (FIG. 6).

The first fillet 274 and the second fillet 276 are predetermined based on an optimization of the fluid mechanics, heat transfer, and stress concentrations in the cooling pin 268 as is known to one skilled in the art. Such fluid mechanics and heat transfer methods may include utilizing a suitable commercially available computational fluid dynamics conjugate code such as STAR CCM+, commercially available from Siemens AG. Stress analyses may be performed using a commercially available finite element code such as ANSYS, commercially available from Ansys, Inc. To minimize dust accumulation on the upstream first fillet 274, the first fillet 274 may be larger than the second fillet 276. In some embodiments, the first fillet 274 may be about 10% to about 100% larger than the second fillet 276. However, in other embodiments, results from the optimization analyses based on fluid mechanics, heat transfer, and stress analyses may require that first fillet 274 be equal to the second fillet 276 or less than the second fillet 276. In addition, small fillets 275 are also employed to minimize stress concentrations at the interface between the cooling pin 268 and the first surface 240. The small fillets 275 may be between about 0.005 inches (in.) and about 0.025 inches (in.) depending on the size of the turbine vane 208, and are smaller than the first fillet 274 and the second fillet 276. With reference to FIG. 6, generally the shape of the cooling pin 268 is defined in cross-section by a first circle 288, a second circle 290 and a pair of tangent lines 292, 294. In one example, the small fillets 275 are tangent around the perimeter of the cooling pin 268 as defined in cross-section by the first circle 288, the second circle 290 and the pair of tangent lines 292, 294. In other embodiments, space or manufacturing limitations may require that the small fillets 275 not be tangent around the perimeter of the cooling pin 268. It should be noted, however, that the small fillets 275 are not required to be tangent to the first surface 240.

Figure 6:
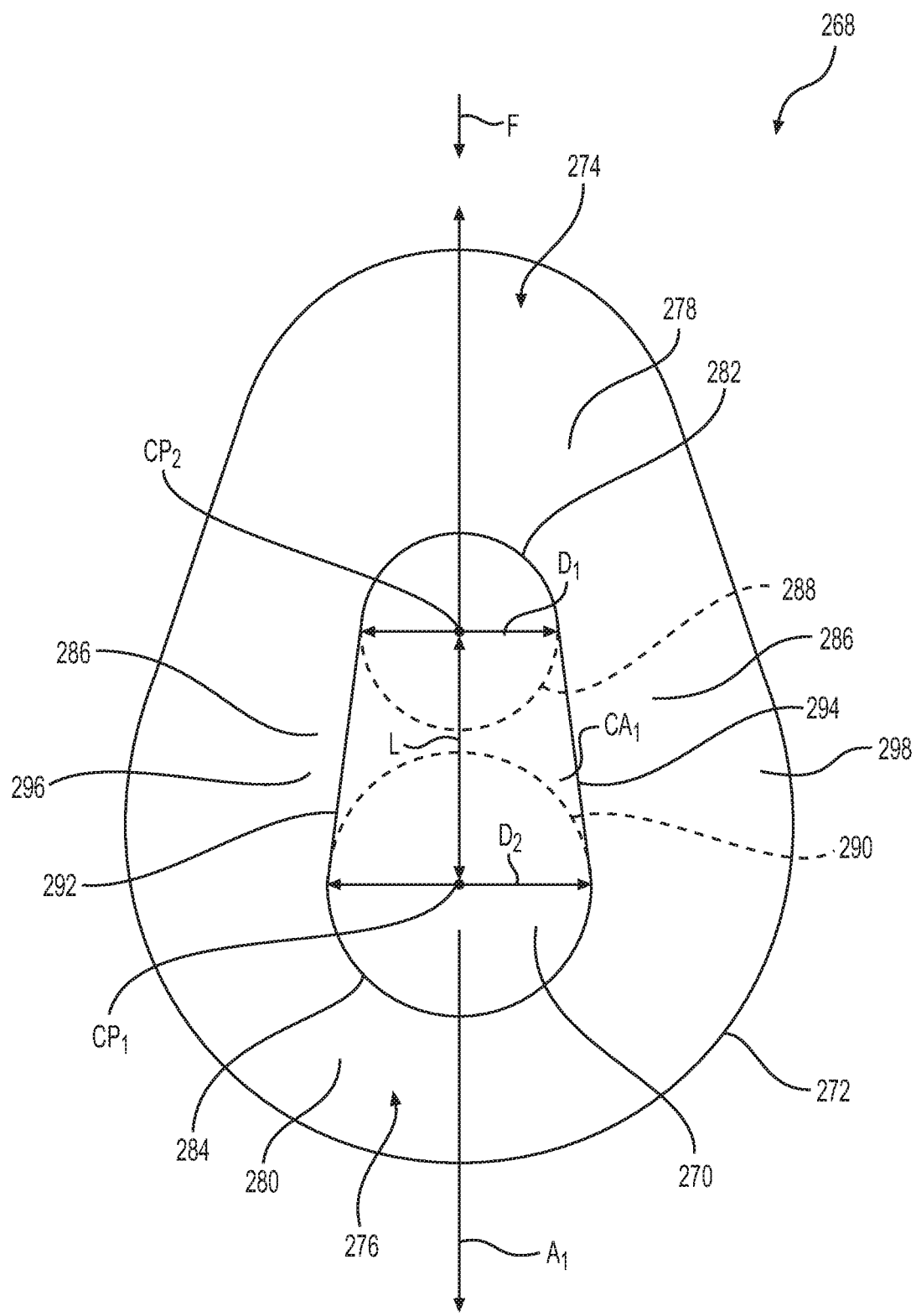
FIG. 6 is an end view of a first pin end of one of the plurality of cooling features of FIG. 4.
Figure 6A:
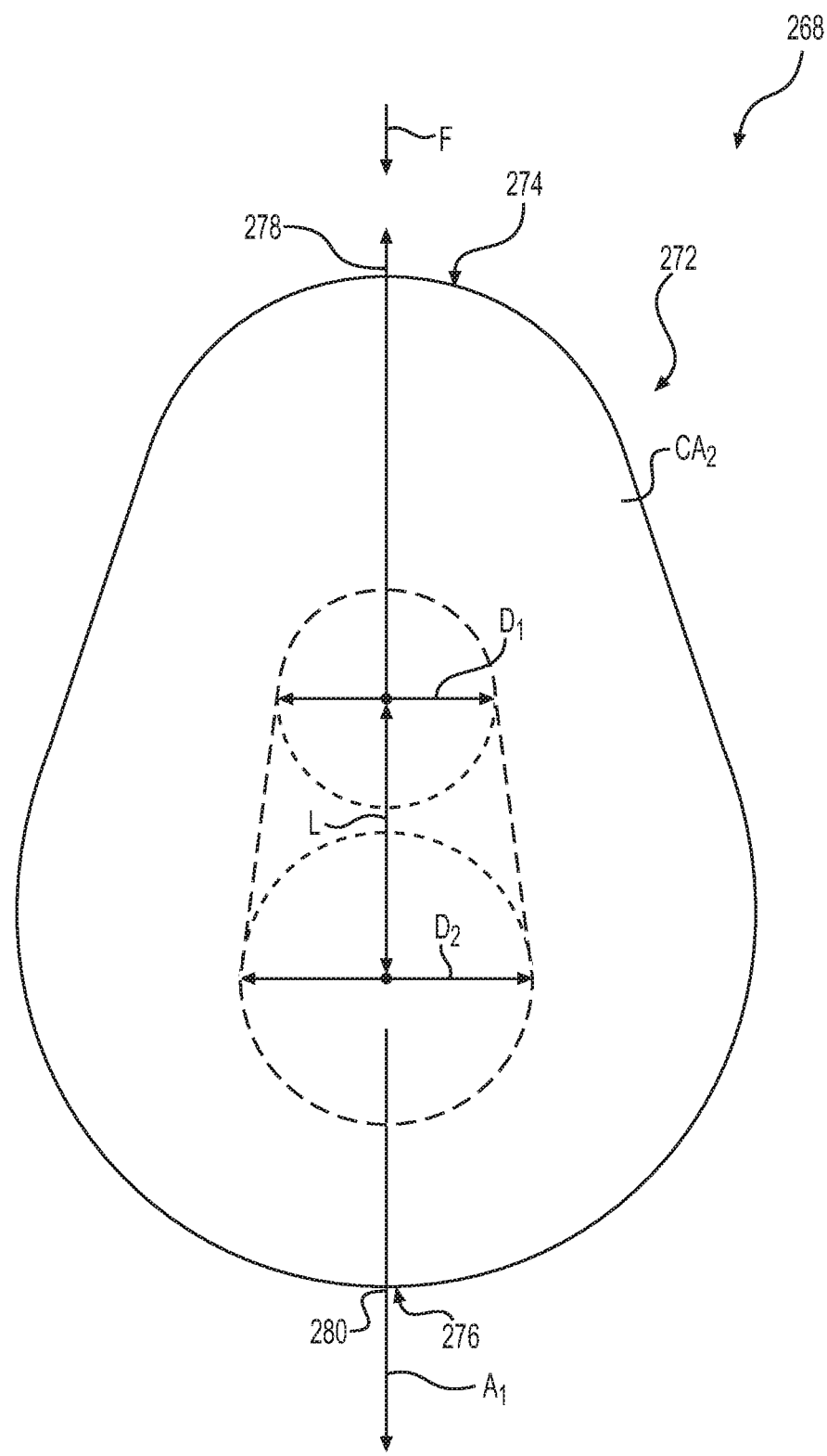
FIG. 6A is an end view of a second pin end of one of the plurality of cooling features of FIG. 4.

With reference to FIG. 6, an end view of one of the cooling pins 268 taken from the first pin end 270 is shown, and in FIG. 6A, an end view of one of the cooling pins 268 taken from the second pin end 272 is shown. The fillets 275, 274, 276 result in the first pin end 270 and the second pin end 272 having a different cross-sectional area, and thus, different surface area at the first pin end 270 and the second pin end 272, respectively. Stated another way, the first fillet 274 and the second fillet 276 result in the cooling pins 268 having an enlarged cross-sectional area starting from the first fillet 274 and the second fillet 276 to the second pin end 272. The small fillets 275 also result in a slight increase in the cross-sectional area at the first pin end 270. Thus, the first pin end 270, which is in contact with the first surface 240, has a different cross-sectional area than the second pin end 272, which is in contact with the second surface 242. In this example, the first pin end 270 has a first cross-sectional area CA1 (FIG. 6) that is smaller than a second cross-sectional area CA2 (FIG. 6A) of the second pin end 272. In one example, the first cross-sectional area CA1 is about 0.000471 square inches (sq. in.) to about 0.0023 square inches (sq. in.); and the second cross-sectional area CA2 is about 0.000495 square inches (sq. in.) to about 0.00245 square inches (sq. in.).

In this example, the cooling pin 268 has the first surface 278 and the second surface 280 that are opposed along an axis A1 and that extend from the first pin end 270 to the second pin end 272. The first surface 278 is upstream from the second surface 280 in the cooling fluid F. Stated another way, the first surface 278 faces the outer platform inlet bore 234 (FIG. 2) so as to be positioned upstream in the cooling fluid F and defines a pin leading edge for the cooling pin 268. The second surface 280, which is opposite the first surface 278, defines a pin trailing edge for the cooling pin 268. With reference to FIG. 6, the first surface 278 has a first curved surface 282 defined by a first, minor diameter $D_1$, and the second surface 280 has a second curved surface 284 defined by a second, major diameter $D_2$. The first, minor diameter $D_1$ is smaller than the second, major diameter $D_2$. In one example, the first, minor diameter $D_1$ is about 0.010 inches (in.) to about 0.050 inches (in.); and the second, major diameter $D_2$ is about 0.020 inches (in.) to about 0.100 inches (in.). The center of first, minor diameter $D_1$ is spaced apart from the center of second, major diameter $D_2$ by a length L. In one example, the length L is about 0.005 inches (in.) to about 0.150 inches (in.). The first curved surface 282 and the second curved surface 284 are interconnected by a pair of surfaces 286 that are defined by a pair of planes that are substantially tangent to a respective one of the first curved surface 282 and the second curved surface 284. It should be noted, however, that the first curved surface 282 and the second curved surface 284 need not be interconnected by a pair of planes that are substantially tangent to a respective one of the first curved surface 282 and the second curved surface 284. Rather, the first curved surface 282 and the second curved surface 284 may be interconnected by a pair of straight, concave, convex, other shaped surfaces. In certain embodiments, the cooling pins 268 may taper (as shown in FIG. 5, FIG. 6, and FIG. 6A) from the first surface 240 to the second surface 242 based on fluid mechanics analysis optimization results.

Generally, as discussed, the shape of the cooling pin 268 is defined in cross-section by the first circle 288, the second circle 290 and the pair of tangent lines 292, 294. As the shape of the cooling pin 268 in cross-section is substantially the same as the shape of the each of the plurality of shaped cooling pins 262 of commonly assigned U.S. application Ser. No. 15/475,597, filed Mar. 31, 2017, to Benjamin Dosland Kamrath et. al., the relevant portion of which is incorporated herein by reference, the cross-sectional shape of the cooling pin 268 will not be discussed in detail herein. Briefly, the first circle 288 defines the first curved surface 282 at the first surface 278 and has the first, minor diameter $D_1$. The second circle 290 defines the second curved surface 284 at the second surface 280 and has the second, major diameter $D_2$. The first circle 288 includes a second center point $CP_2$, and the second circle 290 includes a first center point $CP_1$. The first center point $CP_1$ is spaced apart from the second center point $CP_2$ by the length L. The length L is greater than zero. Thus, the first curved surface 282 is spaced apart from the second curved surface 284 by the length L.

The tangent lines 292, 294 interconnect the first curved surface 282 and the second curved surface 284. Generally, the tangent line 292 touches the first curved surface 282 and the second curved surface 284 on a first side 296 of the cooling pin 268. The tangent line 294 touches the first curved surface 282 and the second curved surface 284 on a second side 298 of the cooling pin 268. By having the first surface 278 of the cooling pin 268 formed with the first, minor diameter $D_1$, the reduced diameter of the first surface 278 minimizes an accumulation of sand and dust particles in the stagnation region on the first surface 278 of the cooling pin 268.

Figure 7:
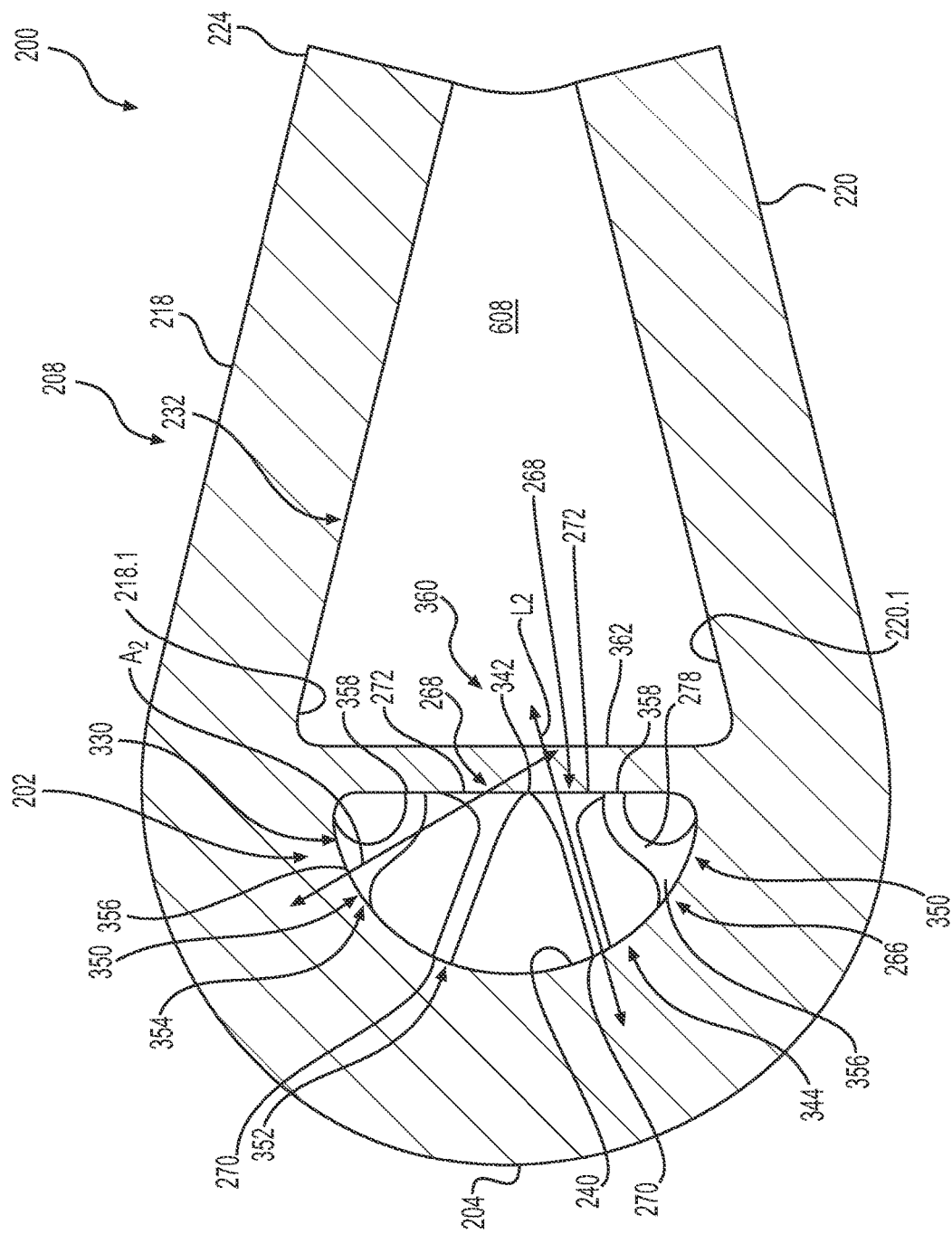
FIG. 7 is a cross-sectional view taken from the perspective of line 4-4 of FIG. 3, which illustrates another exemplary plurality of cooling features associated with a first conduit of the dust tolerant cooling system in accordance with various embodiments.

It will be understood that the cooling features 244 associated with first conduit 230 may be configured differently to provide improved cooling of the leading edge 204 within the first conduit 230. In one example, with reference to FIG. 7, an exemplary first conduit 330 having a plurality of cooling features 344 for use with the airfoil 200 is shown. As the first conduit 330 includes features that are substantially similar to or the same as the first conduit 230 discussed with regard to FIGS. 1-6, the same reference numerals will be used to denote the same or similar features. Similar to the first conduit 230 of FIGS. 1-6, the first conduit 330 is in fluid communication with the source of the cooling fluid F to cool the leading edge 204 of the airfoil 200. The first conduit 330 includes the outer platform inlet bore 234 (FIG. 2), the airfoil inlet 236 (FIG. 2), the outlet portion 238 (FIG. 2), the first surface 240, a second surface 342 and the plurality of cooling features 344. The first surface 240 and the second surface 342 cooperate to define the first conduit 330 within the airfoil 200. The first surface 240 is the first, hot wall, and the second surface 342 is the second, cold wall. The first surface 240 is opposite the leading edge 204, and extends along the airfoil 200 from the tip 226 to the root 228 (FIG. 2). In this example, instead of the rib 260, the airfoil 200 includes a rib 360 that separates the first conduit 330 from the second conduit 232. The rib 360 extends from the inner surface 218.1 of the pressure sidewall 218 to the inner surface 220.1 of the suction sidewall 220. The rib 360 defines the second surface 342, and includes a third surface 362 opposite the second surface 342. In this example, the rib 360 is substantially planar such that the second surface 342 and the third surface 362 are substantially flat or planar.

The plurality of cooling features 344 are arranged in the sub-pluralities or rows 266 that are spaced apart radially relative to the longitudinal axis 140 of the gas turbine engine 10 from the root 228 to the tip 226 of the airfoil 200 (FIG. 2). Depending on the size of the turbine vane 208, the number of rows 266 of the cooling features 344 may be between about 4 to about 20. In other embodiments, the number of rows of cooling features 344 may be greater than about 20 or less than about 4. In one example, each row 266 of the plurality of cooling features 344 includes a plurality of cooling pins 268, 350. In this example, each row 266 includes a first pair 352 of the cooling pins 268 and a second pair 354 of the cooling pins 350. The first pair 352 of the cooling pins 268 extends from the first surface 240 to the second surface 342 substantially along a respective first longitudinal axis L2 of each of the first pair 352 of the cooling pins 268.

Each cooling pin 350 includes a third pin end 356, and a fourth pin end 358. The third pin end 356 is coupled to or integrally formed with the first surface 240 and the fourth pin end 358 is coupled to or integrally formed with the second surface 342. The fourth pin end 358 is coupled to or integrally formed with the second surface 342 such that the fourth pin end 358 is offset from a respective second axis A2 that extends through the third pin end 356 of the second pair 354 of the cooling pins 350. Each of the cooling pins 350 also includes the first fillet 274 defined along the first surface 278 (FIG. 6) and the second fillet 276 defined along the second surface 280 (FIG. 6), however, in this example, the first fillet 274 and the second fillet 276 are defined at the third pin end 356 and extend toward the fourth pin end 358. Thus, in this example, the third pin end 356 has a different or greater cross-sectional area than the fourth pin end 358. The first surface 278 is upstream from the second surface 280 in the cooling fluid F (FIG. 6). The first surface 278 has the first curved surface 282 defined by the first, minor diameter $D_1$, and the second surface 280 has the second curved surface 284 defined by the second, major diameter $D_2$ (FIG. 6). The center of first, minor diameter $D_1$ is spaced apart from the center of second, major diameter $D_2$ by a length L (FIG. 6). The first curved surface 282 and the second curved surface 284 are interconnected by the pair of surfaces 286 that are defined by a pair of planes that are substantially tangent to a respective one of the first curved surface 282 and the second curved surface 284 (FIG. 6). In this example, the shape of each of the cooling pins 350 is also defined in cross-section by the first circle 288, the second circle 290 and the pair of tangent lines 292, 294 (FIG. 6). The cooling pins 350 may also include the small fillets 275 (FIG. 5) at the fourth pin end 358. By providing the plurality of cooling features 344 with the first pair 352 of the cooling pins 268 and the second pair 354 of the cooling pins 350, vorticity in the cooling fluid F is also increased within the first conduit 330, while conductive heat transfer is improved within the first conduit 330. Further, the cross-sectional shape of the cooling pins 268, 350 reduces an accumulation of dust and fine particles within the first conduit 330. In certain embodiments, the first pair 352 of the cooling pins 268 may taper from the first surface 240 to the second surface 342 based on fluid mechanics analysis optimization results.

It will be understood that the cooling features 244 associated with first conduit 230 may be configured differently to provide improved cooling of the leading edge 204 within the first conduit 230. In one example, with reference to FIG. 8, an exemplary first conduit 430 having a plurality of cooling features 444 for use with the airfoil 200 is shown. As the first conduit 430 includes features that are substantially similar to or the same as the first conduit 230 discussed with regard to FIGS. 1-6, the same reference numerals will be used to denote the same or similar features. Similar to the first conduit 230 of FIGS. 1-6, the first conduit 430 is in fluid communication with the source of the cooling fluid F to cool the leading edge 204 of the airfoil 200. The first conduit 430 includes the outer platform inlet bore 234 (FIG. 2), the airfoil inlet 236 (FIG. 2), the outlet portion 238 (FIG. 2), the first surface 240, the second surface 242 and the plurality of cooling features 444. The first surface 240 and the second surface 242 cooperate to define the first conduit 430 within the airfoil 200. The first surface 240 is opposite the leading edge 204, and extends along the airfoil 200 from the tip 226 to the root 228 (FIG. 2). The airfoil 200 includes the rib 260 that separates the first conduit 430 from the second conduit 232. The rib 260 defines the second surface 242, and includes the third surface 262 opposite the second surface 242.

Figure 8:
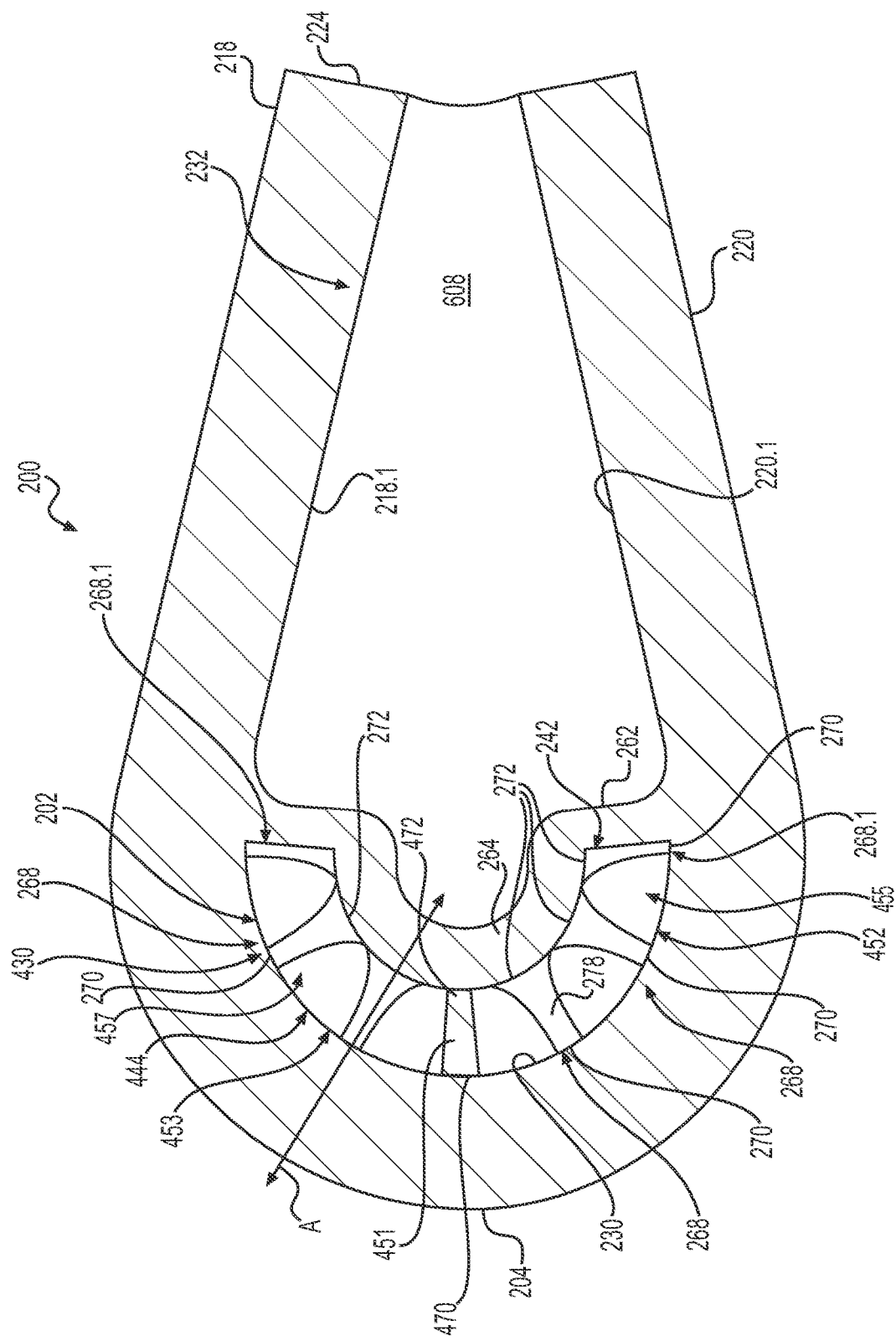
FIG. 8 is a cross-sectional view taken from the perspective of line 4-4 of FIG. 3, which illustrates another exemplary plurality of cooling features associated with a first conduit of the dust tolerant cooling system in accordance with various embodiments.

In this example, the plurality of cooling features 444 comprises the cooling pins 268 and a central rib 451. The cooling pins 268 and the central rib 451 extend from the first surface 240 to the second surface 242. The central rib 451 divides the first conduit 430 into a first flow passage 452 and a second flow passage 453. Stated another way, the central rib 451 extends between the first surface 240 and the second surface 242 from the tip 226 to the root 228 of the airfoil 200 (FIG. 2) and thereby divides the first conduit 430 into the first flow passage 452 and the second flow passage 453. The first flow passage 452 is further separated into a plurality of the first flow passages 452 by a sub-plurality 455 of the cooling pins 268 positioned within or integrally formed within the first flow passage 452; and the second flow passage 453 is further separated into a plurality of the second flow passages 453 by a sub-plurality 457 of the cooling pins 268 positioned within or integrally formed within the second flow passage 453. As shown in FIG. 8, in one example, the plurality of cooling features 444 includes about four cooling pins 268 and includes about two half cooling pins 268.1. The half cooling pins 268.1 comprise one-half of the cooling pin 268 cut along the central axis A of the cooling pin 268. Each of the cooling pins 268 extends from the first surface 240 to the second surface 242 to facilitate convective heat transfer between the cooling fluid F and the leading edge 204. In this example, each of the half cooling pins 268.1 extends from the first surface 240 and extends along the second surface 242 to facilitate heat transfer. In this example, each of the first flow passage 452 and the second flow passage 453 includes two cooling pins 268 and one half cooling pin 268.1; however, it will be understood that the first flow passage 452 and the second flow passage 453 may include any number of the cooling pins 268, and moreover, the first flow passage 452 and the second flow passage 453 may include a different number of the cooling pins 268. The plurality of cooling features 444 are arranged in the plurality of rows 266, which extend radially from the tip 226 to the root 228 of the airfoil 200 (FIG. 2) within the respective one of the first flow passage 452 and the second flow passage 453.

The central rib 451 includes a first rib end 470, and an opposite second rib end 472. The first rib end 470 is coupled to or integrally formed with the first surface 240 and the second rib end 472 is coupled to or integrally formed with the second surface 242. The central rib 451 extends radially from the outer platform inlet bore 234 to near the outlet portion 238 to enable local tailoring of the individual heat loads in the first flow passage 452 and the second flow passage 453. This local tailoring of heat transfer may be accomplished by changing the size and/or density of the cooling pins 268 in the respective first flow passage 452 and the second flow passage 453. In one example, the central rib 451 also includes the first fillet 274 (FIG. 6). The first fillet 274 is defined along a top surface (not shown) of the central rib 451 at the second rib end 472 to extend toward the first rib end 470. The central rib 451 may also include a bottom surface (not shown) opposite the top surface. The bottom surface of the central rib 451 may include the second fillet 276 (FIG. 6). The second fillet 276 is defined along the bottom surface at the second rib end 472 to extend toward the first rib end 470. In addition, the central rib 451 may include the small fillets 275 (FIG. 6) to minimize stress concentrations at the interface between the central rib 451 and the first surface 240. It should be noted, however, that while the central rib 451 is described herein as including the first fillet 274, the second fillet 276 and the small fillets 275, the central rib 451 may include fillets along the first rib end 470 and the second rib end 472 that are different in size and shape than those of the cooling pins 268. It is also noted that there may be more than one central rib 451, thereby creating multiple conduits.

As can be appreciated, each of the cooling pins 268 of FIG. 8 are the same as the cooling pins 268 shown in FIG. 4. The first surface 278 is upstream from the second surface 280 (FIG. 5) in the cooling fluid F. The first surface 278 faces the outer platform inlet bore 234 (FIG. 2) so as to be positioned upstream in the cooling fluid F.

With reference back to FIG. 2, the second conduit 232 is shown in greater detail. In this example, the second conduit 232 includes a second outer platform inlet bore 600, a second airfoil inlet 602, a second outlet portion 604, the third surface 262, 362, a fourth surface 608 and a fifth surface 610. Optionally, the second conduit 232 may include a second plurality of cooling features 606, such as a pin fin array or bank. For clarity, the second plurality of cooling features 606 is shown in FIG. 4, but not in FIGS. 7 and 8 with the understanding that the second conduit 232 of each of FIGS. 7 and 8 optionally includes the second plurality of cooling features 606. The second outer platform inlet bore 600 is defined through the outer platform 216. The second outer platform inlet bore 600 fluidly couples the source of the cooling fluid F to the second airfoil inlet 602 to supply the second conduit 232 with the cooling fluid F.

With continued reference to FIG. 2, the second airfoil inlet 602 is defined at the tip 226 so as to be positioned at the outer diameter. Thus, the second conduit 232 also has an inlet defined at the outer diameter. The second airfoil inlet 602 is in fluid communication with the second outer platform inlet bore 600 to receive the cooling fluid F. The second outlet portion 604 is defined through the trailing edge 224 of the airfoil 200. In one example, the second outlet portion 604 is defined through the trailing edge 224 to exhaust the cooling fluid F along the trailing edge 224 of the airfoil 200 between the tip 226 and the root 228. In this example, with reference to FIG. 4, the second outlet portion 604 may be defined between the inner surface 218.1 of the pressure sidewall 218 and the inner surface 220.1 of the suction sidewall 220. The second outlet portion 604 may define a single outlet, or may define a plurality of individual outlets along the trailing edge 224 from the tip 226 to the root 228 (FIG. 2). The second plurality of cooling features 606 may be defined to extend between the inner surface 218.1 of the pressure sidewall 218 and the inner surface 220.1 of the suction sidewall 220 from the tip 226 to the root 228 of the airfoil 200 within the second conduit 232.

The second conduit 232 is defined within the airfoil 200 to extend from the respective third surface 262, 362 of the respective rib 260, 360 to the trailing edge 224. The respective third surface 262, 362 is in fluid communication with the second airfoil inlet 602 to receive the cooling fluid F. The fourth surface 608 defines a downstream boundary of the second conduit 232, and extends from the respective third surface 262, 362 to the trailing edge 224. The fifth surface 610, adjacent to the tip 226, may define an upper boundary of the second conduit 232. The respective third surface 262, 362, the fourth surface 608 and the fifth surface 610 cooperate to direct the cooling fluid F from the second airfoil inlet 602 through the second outlet portion 604.

With reference to FIG. 4, in one example, each of the cooling features 244, 344, 444, 606 are integrally formed, monolithic or one-piece, and are composed of a metal or metal alloy. In this example, the dust tolerant cooling system 202, including each of the cooling features 244, 344, 444, 606 is integrally formed, monolithic or one-piece with the airfoil 200, and the cooling features 244, 344, 444, 606 are composed of the same metal or metal alloy as the airfoil 200. Generally, the airfoil 200 and the cooling features 244, 344, 444, 606 are composed of an oxidation and stress rupture resistant, single crystal, nickel-based superalloy, including, but not limited to, the nickel-based superalloy commercially identified as "CMSX 4" or the nickel-based superalloy identified as "SC180." Alternatively, the airfoil 200 and the cooling features 244, 344, 444, 606 may be composed of directionally solidified nickel base alloys, including, but not limited to, Mar-M-247DS. As a further alternative, the airfoil 200 and the cooling features 244, 344, 444, 606 may be composed of polycrystalline alloys, including, but not limited to, Mar-M-247EA.

In one example, in order to manufacture the airfoil 200 including the dust tolerant cooling system 202 with the respective one of the cooling features 244, 344, 444, a core that defines the airfoil 200 including the respective one of the cooling features 244, 344, 444, the respective first conduit 230, 330, 430 and the second conduit 232 with the second plurality of cooling features 606, if included, is cast, molded or printed from a ceramic material. In this example, the core is manufactured from a ceramic using ceramic additive manufacturing or with fugitive cores. With the core formed, the core is positioned within a die. With the core positioned within the die, the die is injected with liquid wax such that liquid wax surrounds the core. A wax sprue or conduit may also be coupled to the cavity within the die to aid in the formation of the airfoil 200. Once the wax has hardened to form a wax pattern, the wax pattern is coated or dipped in ceramic to create a ceramic mold about the wax pattern. After coating the wax pattern with ceramic, the wax pattern may be subject to stuccoing and hardening. The coating, stuccoing and hardening processes may be repeated until the ceramic mold has reached the desired thickness.

With the ceramic mold at the desired thickness, the wax is heated to melt the wax out of the ceramic mold. With the wax melted out of the ceramic mold, voids remain surrounding the core, and the ceramic mold is filled with molten metal or metal alloy. In one example, the molten metal is poured down an opening created by the wax sprue. It should be noted, however, that vacuum drawing may be used to fill the ceramic mold with the molten metal. Once the metal or metal alloy has solidified, the ceramic is removed from the metal or metal alloy, through chemical leaching, for example, leaving the dust tolerant cooling system 202, including the respective one of the cooling features 244, 344, 444, the respective first conduit 230, 330, 430 and the second conduit 232 (optionally with the second plurality of cooling features 606), formed in the airfoil 200, as illustrated in FIG. 4. It should be noted that alternatively, the respective one of the cooling features 244, 344, 444, 606 may be formed in the airfoil 200 using conventional dies with one or more portions of the core (or portions adjacent to the core) comprising a fugitive core insert. As a further alternative, the airfoil 200 including the dust tolerant cooling system 202 may be formed using other additive manufacturing processes, including, but not limited to, direct metal laser sintering, electron-beam melting, binder jet printing, etc.

The above process may be repeated to form a plurality of the airfoils 200. With the plurality of airfoils 200 formed, the airfoils 200 may be positioned in an annular array. The outer platform 216 may be cast around the outer diameter or tip 226 of each of the airfoils 200 and the inner platform 214 may be cast around the inner diameter or root 228 of each of the airfoils 200. Generally, the outer platform 216 and the inner platform 214 are composed of a suitable metal or metal alloy, including, but not limited to, a nickel superalloy, such as Mar-M-247DS or Mar-M-247EA. The outer platform 216 may be cast about the outer diameter or tips 226 of the airfoils 200, and the inner platform 214 may be cast about the inner diameter or roots 228 of the airfoils 200. The outer platform inlet bore 234 and the second outer platform inlet bore 600 may be defined through the casting of the outer platform 216 using a suitable die, or may be formed by machining the outer platform 216 after casting. The second outlet flow path 250 may be defined in the inner platform 214 through the casting of the inner platform 214 using a suitable die, or may be defined by machining the inner platform 214 after casting. Although not shown herein, the airfoil 200 may be formed with one or more features that enable the attachment of the airfoil 200 to the inner platform 214 and/or outer platform 216, such as an extension for forming a slip joint (not shown). While the exemplary embodiment described herein employs a bi-cast or full-ring casting, it should be understood that the airfoil 200 and the cooling features 244, 344, 444 (and optionally, the second plurality of cooling features 606) may be formed as traditional cast segments such as doublets, triplets, or other numbers of airfoils per segment. In this example, the appropriate number of segments is then assembled to form the full turbine vane 208 assembly.

With the turbine vane 208 formed, the turbine vane 208 is installed into the gas turbine engine 100 (FIG. 1). In use, as the gas turbine engine 100 operates, the cooling fluid F is supplied to the first conduit 230 and the second conduit 232 through the outer platform inlet bore 234 and the second outer platform inlet bore 600, respectively. With reference to FIG. 2, the cooling fluid F flows through the first conduit 230 along the leading edge 204, and the cooling features 244, 344, 444 cooperate to transfer heat from the leading edge 204 into the cooling fluid F while reducing an accumulation of dust and fine particles within the first conduit 230. The cooling fluid F is split by the flow splitter 246 and flows into the first outlet flow path 248 and the second outlet flow path 250. As cooling fluid F flows through the second outlet flow path 250, the cooling fluid F cools the inner platform 214. The cooling fluid F in the first outlet flow path 248 and the second outlet flow path 250 converges downstream of the flow splitter 246 and exits the outlet 252 of the airfoil 200 along the trailing edge 224. The cooling fluid F that flows through the second conduit 232 cools the airfoil 200 downstream of the rib 260, 360 and may cooperate with the cooling features 606 to transfer heat into the cooling fluid F before the cooling fluid F exits the second conduit 232 along the trailing edge 224.

It will be understood that the turbine vane 208, the airfoil 200 and the dust tolerant cooling system 202 described with regard to FIGS. 1-8 may be configured differently to provide dust tolerant cooling to the leading edge 204. In one example, with reference to FIG. 9, an airfoil 700 with a dust tolerant cooling system 702 for use with a turbine vane 708 is shown. As the airfoil 700, the dust tolerant cooling system 702 and the turbine vane 708 include components that are substantially similar to or the same as the airfoil 200, the dust tolerant cooling system 202 and the turbine vane 208 discussed with regard to FIGS. 1-8, the same reference numerals will be used to denote the same or similar features. The dust tolerant cooling system 702 may be employed with the turbine vane 208 to provide improved cooling along the leading edge 204 of the airfoil 700.

The turbine vane 708 includes a pair of opposing endwalls or platforms 714, 216, and the airfoils 700 are arranged in an annular array between the pair of opposing platforms 714, 216. The platforms 714, 216 have an annular or circular main or body section. The platforms 714, 216 are positioned in a concentric relationship with the airfoils 700 disposed in the radially extending annular array between the platforms 714, 216. In this example, the platform 216 is the outer platform and the platform 714 is an inner platform. The outer platform 216 circumscribes the inner platform 714 and is spaced therefrom to define a portion of the combustion gas flow path in the gas turbine engine 100. The plurality of airfoils 700 is generally disposed in the portion of the combustion gas flow path. In one example, the inner platform 714 is coupled to each of the airfoils 700 at an inner diameter, and the outer platform 216 is coupled to each of the airfoils 700 at an outer diameter.

Each of the airfoils 700 has the pressure sidewall 218 and the suction sidewall 220. The pressure and suction sidewalls 218, 220 interconnect the leading edge 204 and the trailing edge 224 of each airfoil 700. The airfoil 700 includes the tip 226 and the root 228, which are spaced apart by a height H1 of the airfoil 700 or in a spanwise direction. The tip 226 is at the outer diameter of the airfoil 700 and is coupled to the outer platform 216 and the root 228 is at the inner diameter and is coupled to the inner platform 714.

In one example, for each of the airfoils 700, the dust tolerant cooling system 702 is defined through the outer platform 216 and the inner platform 714 associated with the respective one of the airfoils 700, and a portion of the dust tolerant cooling system 702 is defined between the pressure and suction sidewalls 218, 220 of the respective airfoil 700. In this example, the dust tolerant cooling system 702 includes a first, leading edge conduit or first conduit 730 and a second, trailing edge conduit or second conduit 732. The first conduit 730 is in fluid communication with the source of the cooling fluid F to cool the leading edge 204 of the airfoil 700, and the second conduit 732 is in fluid communication with the source of the cooling fluid F to cool the airfoil 700 downstream of the leading edge 204 to the trailing edge 224.

In one example, the first conduit 730 includes the outer platform inlet bore 234, the airfoil inlet 236, an outlet portion 738, the first surface 240, the second surface 242 and the plurality of cooling features 244 (FIG. 4). It should be noted that in certain embodiments, the airfoil 700 may include the plurality of cooling features 344 (FIG. 7) or the plurality of cooling features 444 (FIG. 8). The outer platform inlet bore 234 fluidly couples the source of the cooling fluid F to the airfoil inlet 236 to supply the first conduit 730 with the cooling fluid F. The airfoil inlet 236 is defined at the tip 226 so as to be positioned at the outer diameter and is in fluid communication with the outer platform inlet bore 234 to receive the cooling fluid F.

In one example, the outlet portion 738 is defined through the inner platform 714. In this regard, the inner platform 714 has a first platform surface 740 opposite a second platform surface 742, and a first platform end 744 opposite a second platform end 746. In this example, the outlet portion 738 is defined as a fluid flow conduit that is defined within the first platform surface 740 and spaced a distance apart from the first platform end 744. The outlet portion extends from the first platform surface 740 toward the second platform surface 742 and defines an outlet 748 that is spaced a distance apart from the second platform end 746. The cooling fluid F from the first conduit 730 exits the inner platform 714 at the outlet 748. By exiting the inner platform 714 at the outlet 748, as the cooling fluid F has a lower static pressure, the cooling fluid F suppresses hot fluid having a higher static pressure from flowing into a gap created between the turbine vane 208 and an adjacent turbine rotor 750.

The second conduit 732 includes the second outer platform inlet bore 600, the second airfoil inlet 602, the second outlet portion 604, the third surface 262, 362, a fourth surface 752 and the fifth surface 610. Optionally, the second conduit 732 may include a second plurality of cooling features 606, such as a pin fin array or bank (shown in FIG. 4 and omitted for clarity in FIG. 9). The second outer platform inlet bore 600 is defined through the outer platform 216. The second outer platform inlet bore 600 fluidly couples the source of the cooling fluid F to the second airfoil inlet 602 to supply the second conduit 732 with the cooling fluid F.

Figure 9:
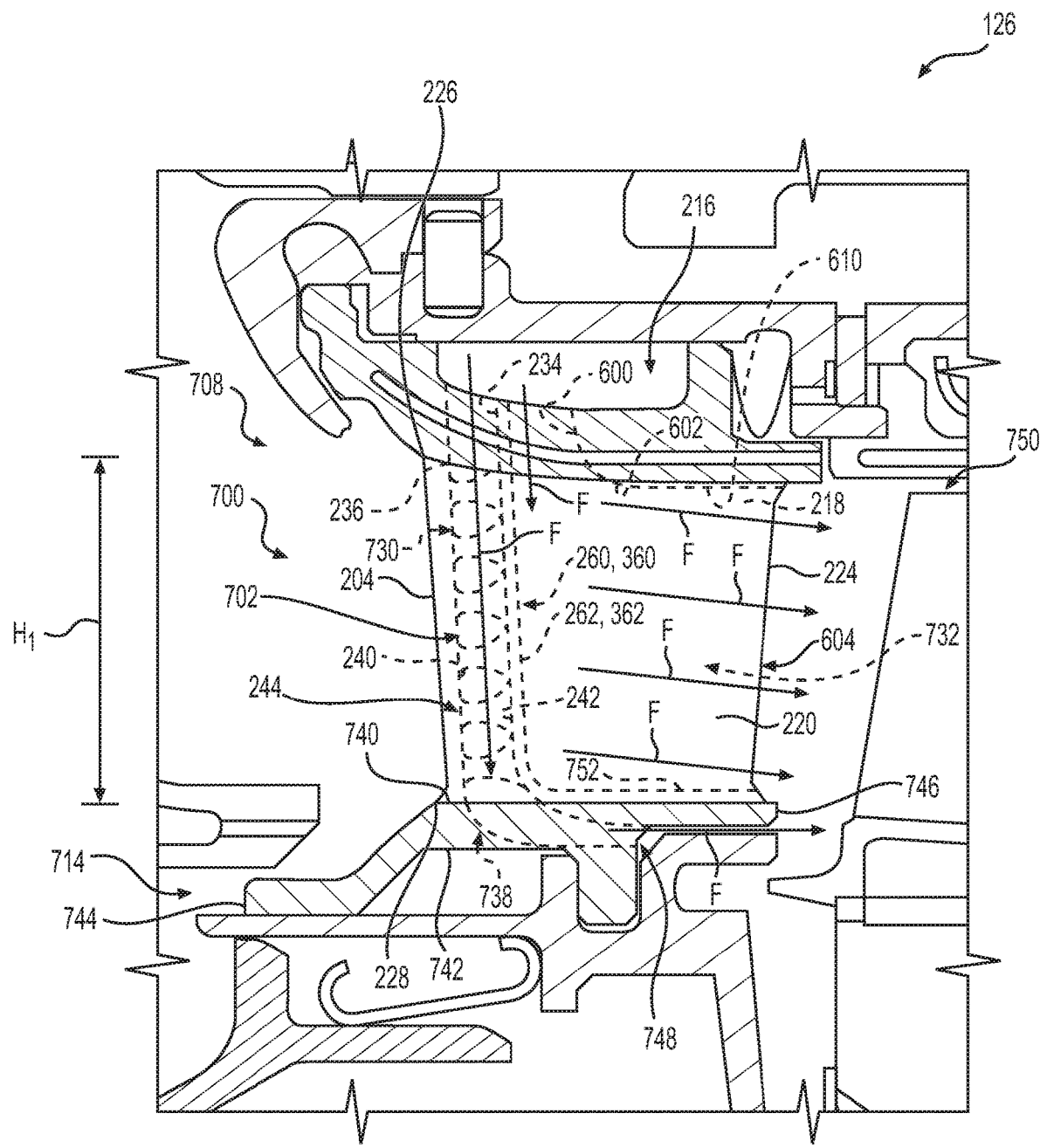
FIG. 9 is a detail cross-sectional view of the gas turbine engine of FIG. 1, taken at 2 of FIG. 1, which illustrates an exemplary turbine vane that includes another dust tolerant cooling system that is configured to cool a leading edge of an airfoil of the turbine vane while reducing the accumulation of fine sand and dust particles within the airfoil.

With continued reference to FIG. 9, the second airfoil inlet 602 is defined at the tip 226 so as to be positioned at the outer diameter. The second airfoil inlet 602 is in fluid communication with the second outer platform inlet bore 600 to receive the cooling fluid F. The second outlet portion 604 is defined through the trailing edge 224 of the airfoil 700. In one example, the second outlet portion 604 is defined through the trailing edge 224 to exhaust the cooling fluid F along the trailing edge 224 of the airfoil 700 between the tip 226 and the root 228. The second outlet portion 604 may define a single outlet, or may define a plurality of individual outlets along the trailing edge 224 from the tip 226 to the root 228.

The second conduit 732 is defined within the airfoil 700 to extend from the respective third surface 262, 362 of the respective rib 260, 360 to the trailing edge 224. The respective third surface 262, 362 is in fluid communication with the second airfoil inlet 602 to receive the cooling fluid F. The fourth surface 752 defines a downstream boundary of the second conduit 732, and extends along the root 228 of the airfoil 700 from the respective third surface 262, 362 to the trailing edge 224. The fifth surface 610, adjacent to the tip 226, may define an upper boundary of the second conduit 732. The respective third surface 262, 362, the fourth surface 752 and the fifth surface 610 cooperate to direct the cooling fluid F from the second airfoil inlet 602 through the second outlet portion 604.

As the airfoil 700 and the dust tolerant cooling system 702 may be manufactured in the same manner as the airfoil 200 and the dust tolerant cooling system 202 discussed with regard to FIGS. 1-8, the manufacture of the airfoil 700 and the dust tolerant cooling system 702 will not be discussed in detail herein. Briefly, however, a core that defines the airfoil 700 including the respective cooling features 244, 344, 444, the first conduit 730 and the second conduit 732 (optionally with the second plurality of cooling features 606) is printed from a ceramic material, using ceramic additive manufacturing for example, and investment casting is performed to form the airfoil 700 including the integrally formed dust tolerant cooling system 702. Alternatively, the dust tolerant cooling system 702 may be formed in the airfoil 700 using conventional dies with one or more portions of the core (or portions adjacent to the core) comprising a fugitive core insert. As a further alternative, the airfoil 700 including the dust tolerant cooling system 702 may be formed using other additive manufacturing processes, including, but not limited to, direct metal laser sintering, electron-beam melting, binder jet printing, etc. This process may be repeated to form a plurality of the airfoils 700. With the plurality of airfoils 700 formed, the airfoils 700 may be positioned in an annular array. The outer platform 216 may be cast around the outer diameter or tip 226 of each of the airfoils 700 and the inner platform 714 may be cast around the inner diameter or root 228 of each of the airfoils 700. The outlet portion 738 may be defined in the inner platform 714 through the casting of the inner platform 714 using a suitable die, or may be defined by machining the inner platform 714 after casting. While the exemplary embodiment described herein employs a bi-cast or full-ring casting, it should be understood that the airfoil 700 and the cooling features 244, 344, 444, 606 may be formed as traditional cast segments such as doublets, triplets, or other numbers of airfoils per segment. In this example, the appropriate number of segments are then assembled to form the full turbine vane 708 assembly.

With the turbine vane 708 formed, the turbine vane 708 is installed into the gas turbine engine 100 (FIG. 1). In use, as the gas turbine engine 100 operates, the cooling fluid F is supplied to the first conduit 730 and the second conduit 732 through the outer platform inlet bore 234 and the second outer platform inlet bore 600, respectively. The cooling fluid F flows through the first conduit 730 along the leading edge 204, and the cooling features 244, 344, 444 cooperate to transfer heat from the leading edge 204 into the cooling fluid F. The cooling fluid F exits the first conduit 730 at the outlet 748, thereby cooling the inner platform 714. The cooling fluid F that flows through the second conduit 232 cools the airfoil 200 downstream of the rib 260, 360 and may cooperate with the cooling features 606 to transfer heat into the cooling fluid F before the cooling fluid F exits the second conduit 732 along the trailing edge 224.

Figure 10:
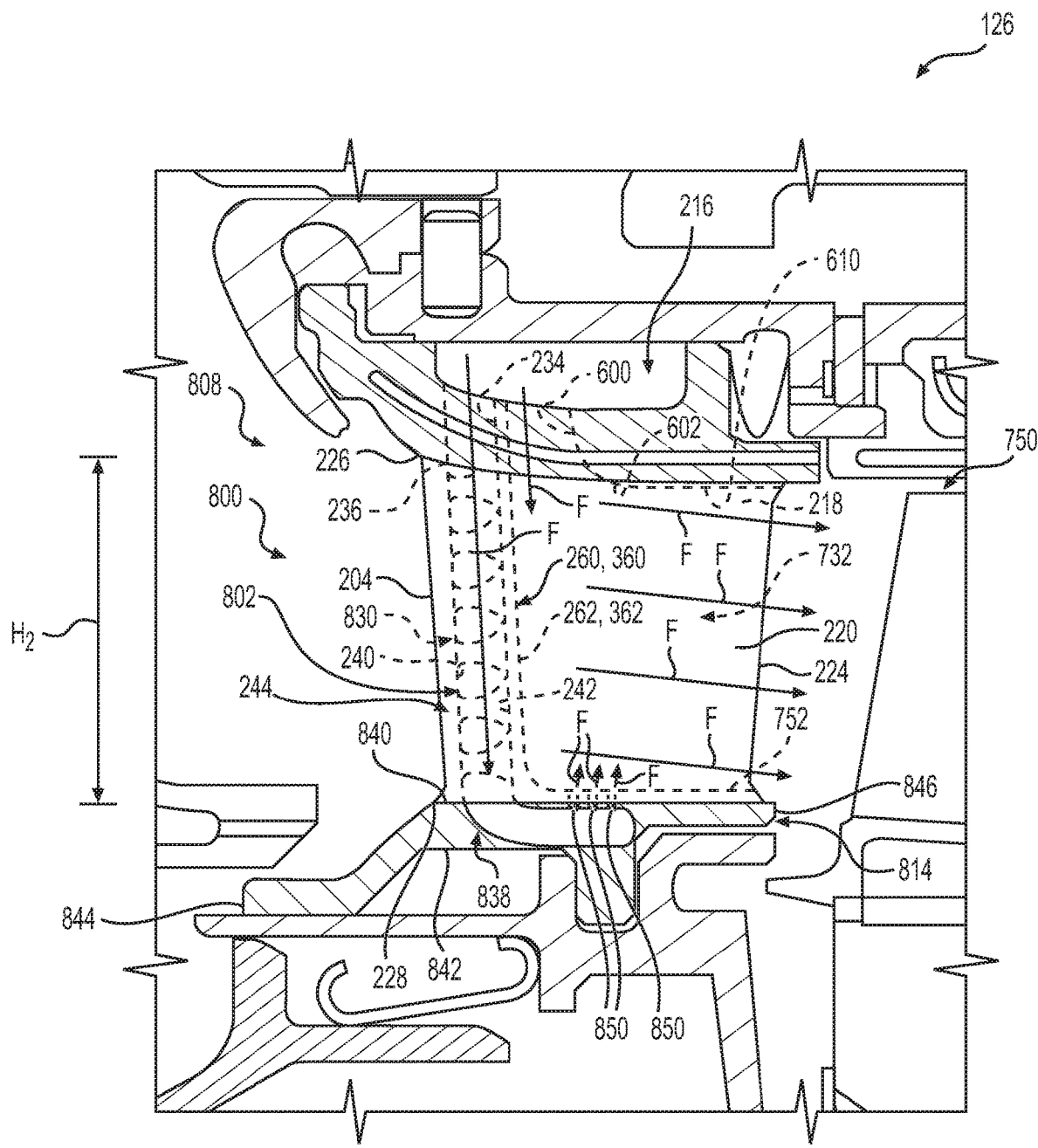
FIG. 10 is a detail cross-sectional view of the gas turbine engine of FIG. 1, taken at 2 of FIG. 1, which illustrates an exemplary turbine vane that includes another dust tolerant cooling system that is configured to cool a leading edge of an airfoil of the turbine vane while reducing the accumulation of fine sand and dust particles within the airfoil.

It will be understood that the turbine vane 208, the airfoil 200 and the dust tolerant cooling system 202 described with regard to FIGS. 1-8 may be configured differently to provide dust tolerant cooling to the leading edge 204. In one example, with reference to FIG. 10, an airfoil 800 with a dust tolerant cooling system 802 for use with a turbine vane 808 is shown. As the airfoil 800, the dust tolerant cooling system 802 and the turbine vane 808 include components substantially similar to or the same as the airfoil 200, the dust tolerant cooling system 202 and the turbine vane 208 discussed with regard to FIGS. 1-8 or the airfoil 700 and the dust tolerant cooling system 702 and the turbine vane 708 discussed with regard to FIG. 9, the same reference numerals will be used to denote the same or similar features. The dust tolerant cooling system 802 may be employed with the turbine vane 808 to provide improved cooling along the leading edge 204 of the airfoil 800.

The turbine vane 808 includes a pair of opposing endwalls or platforms 814, 216, and the airfoils 800 are arranged in an annular array between the pair of opposing platforms 814, 216. The platforms 814, 216 have an annular or circular main or body section. The platforms 814, 216 are positioned in a concentric relationship with the airfoils 800 disposed in the radially extending annular array between the platforms 814, 216. In this example, the platform 216 is the outer platform and the platform 814 is an inner platform. The outer platform 216 circumscribes the inner platform 814 and is spaced therefrom to define a portion of the combustion gas flow path in the gas turbine engine 100. The plurality of airfoils 800 is generally disposed in the portion of the combustion gas flow path. In one example, the inner platform 814 is coupled to each of the airfoils 800 at an inner diameter, and the outer platform 216 is coupled to each of the airfoils 800 at an outer diameter.

Each of the airfoils 800 has the pressure sidewall 218 and the suction sidewall 220. The pressure and suction sidewalls 218, 220 interconnect the leading edge 204 and the trailing edge 224 of each airfoil 800. The airfoil 800 includes the tip 226 and the root 228, which are spaced apart by a height H2 of the airfoil 800 or in a spanwise direction. The tip 226 is at the outer diameter of the airfoil 800 and is coupled to the outer platform 216 and the root 228 is at the inner diameter and is coupled to the inner platform 814.

In one example, for each of the airfoils 800, the dust tolerant cooling system 802 is defined through the outer platform 216 and the inner platform 814 associated with the respective one of the airfoils 800, and a portion of the dust tolerant cooling system 802 is defined between the pressure and suction sidewalls 218, 220 of the respective airfoil 800. In this example, the dust tolerant cooling system 802 includes a first, leading edge conduit or first conduit 830 and the second conduit 732. The first conduit 830 is in fluid communication with the source of the cooling fluid F to cool the leading edge 204 of the airfoil 800, and the second conduit 732 is in fluid communication with the source of the cooling fluid F to cool the airfoil 800 downstream of the leading edge 204 to the trailing edge 224.

In one example, the first conduit 830 includes the outer platform inlet bore 234, the airfoil inlet 236, an outlet portion 838, the first surface 240, the second surface 242 and the plurality of cooling features 244 (FIG. 4). It should be noted that in certain embodiments, the airfoil 800 may include the plurality of cooling features 344 (FIG. 7) or the plurality of cooling features 444 (FIG. 8). The outer platform inlet bore 234 fluidly couples the source of the cooling fluid F to the airfoil inlet 236 to supply the first conduit 830 with the cooling fluid F. The airfoil inlet 236 is defined at the tip 226 so as to be positioned at the outer diameter and is in fluid communication with the outer platform inlet bore 234 to receive the cooling fluid F.

Figure 10A:
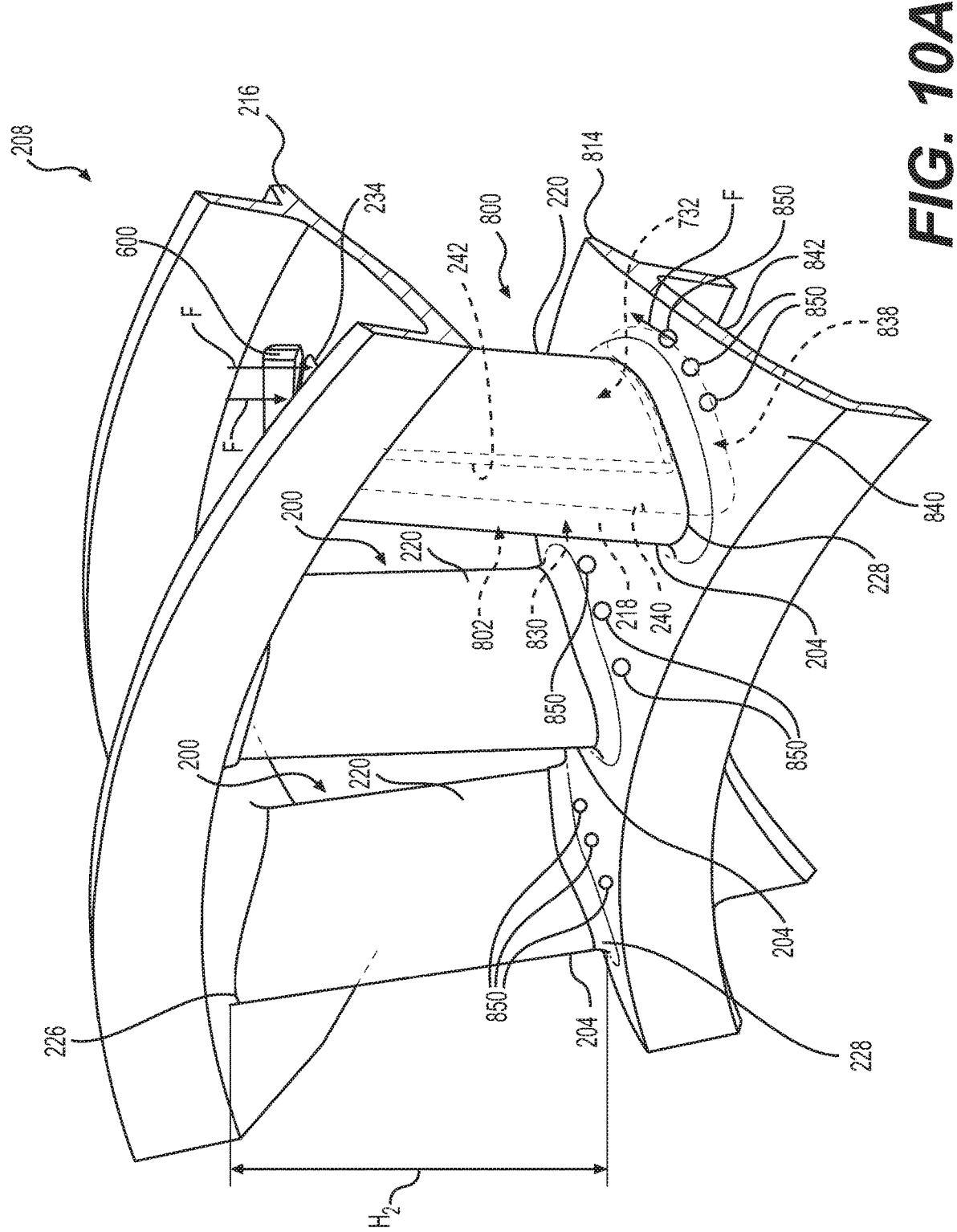
FIG. 10A is a detail perspective view of a portion of the turbine vane of FIG. 11, which illustrates the dust tolerant cooling system configured to cool an inner platform of the turbine vane while reducing the accumulation of fine sand and dust particles within the airfoil.

In one example, the outlet portion 838 is defined through the inner platform 814. In this regard, the inner platform 814 has a first platform surface 840 opposite a second platform surface 842, and a first platform end 844 opposite a second platform end 846. In this example, the outlet portion 838 is defined as a fluid flow conduit that is defined within the first platform surface 840 and spaced a distance apart from the first platform end 844. The outlet portion 838 extends from the first platform surface 840 toward the second platform surface 842 and defines a plurality of film cooling holes 850 that is spaced a distance apart from the second platform end 846. In this regard, with reference to FIG. 10A, in one example, the plurality of film cooling holes 850 are defined through a portion of the first platform surface 840 of the inner platform 814 that spans between the airfoil 800 and a second, adjacent one of the airfoils 800 that is coupled to the inner platform 814 so as to be spaced apart from the airfoil 800. The cooling fluid F from the first conduit 830 exits the inner platform 814 at the plurality of film cooling holes 850. By exiting the inner platform 814 at the plurality of film cooling holes 850, the cooling fluid F cools the first platform surface 840 between adjacent ones of the airfoils 800. It should be noted that in FIG. 10A, the plurality of cooling features 244 (FIG. 10) are omitted for clarity.

Figure 10B:
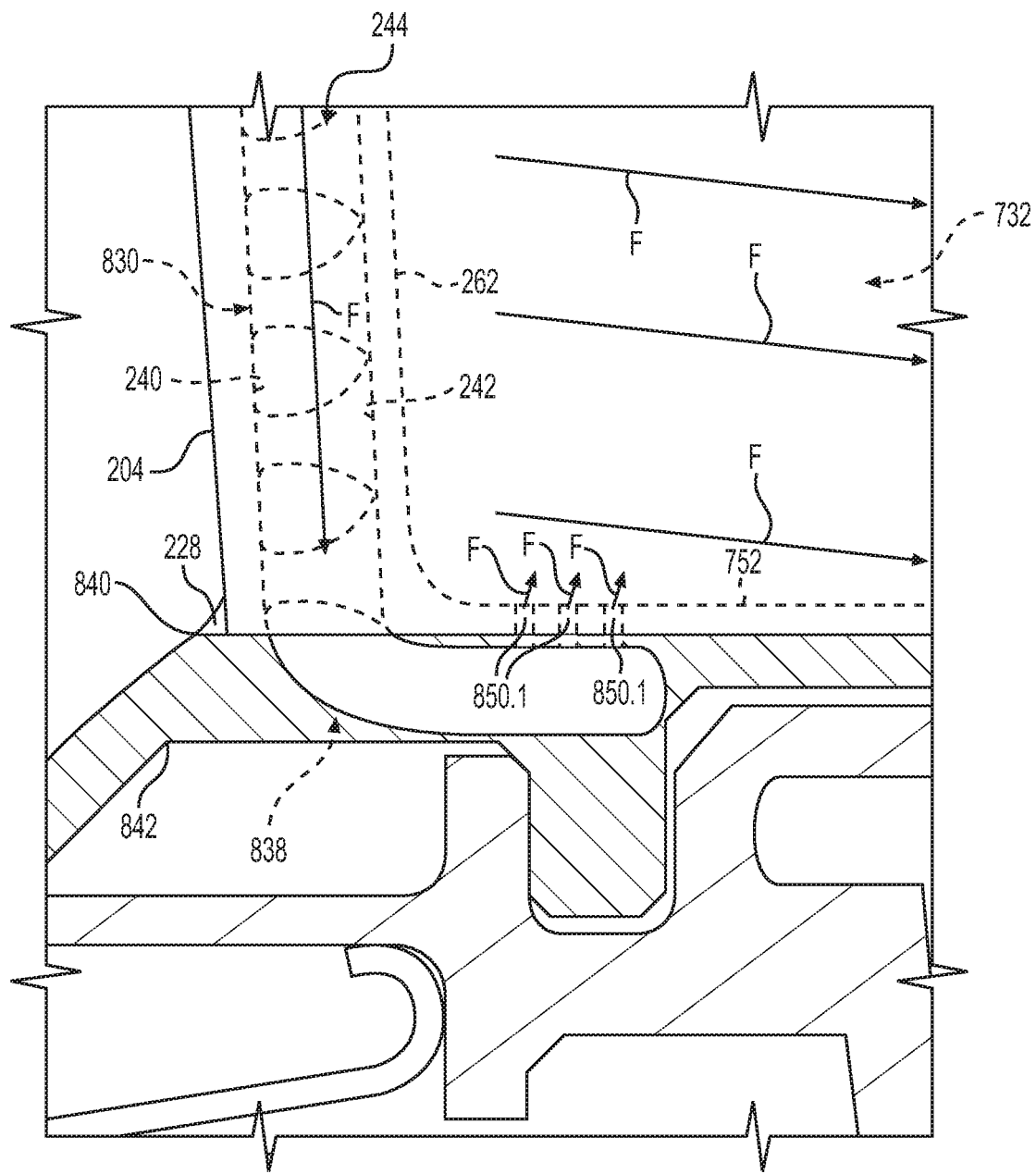
FIG. 10B is a detail cross-sectional view of the gas turbine engine of FIG. 1, taken at 2 of FIG. 1, which illustrates an exemplary turbine vane that includes another dust tolerant cooling system that is configured to cool a leading edge of an airfoil of the turbine vane while reducing the accumulation of fine sand and dust particles within the airfoil.

Alternatively, with reference to FIG. 10B, the outlet portion 838 may be in communication with a plurality of cooling holes 850.1 that are in fluid communication with the second conduit 732. In this example, the cooling fluid F from the first conduit 830 exits the inner platform 814 at the plurality of cooling holes 850.1 and mixes with the cooling fluid F flowing through the second conduit 732 before exiting the second conduit 732 at the trailing edge 224.

As the airfoil 800 and the dust tolerant cooling system 802 may be manufactured in the same manner as the airfoil 200 and the dust tolerant cooling system 202 discussed with regard to FIGS. 1-8, the manufacture of the airfoil 800 and the dust tolerant cooling system 802 will not be discussed in detail herein. Briefly, however, with reference back to FIG. 10, a core that defines the airfoil 800 including the respective cooling features 244, 344, 444 the first conduit 830 and the second conduit 732 (optionally with the second plurality of cooling features 606) is printed from a ceramic material, using ceramic additive manufacturing for example, and investment casting is performed to form the airfoil 800 including the integrally formed dust tolerant cooling system 802. Alternatively, the dust tolerant cooling system 802 may be formed in the airfoil 800 using conventional dies with one or more portions of the core (or portions adjacent to the core) comprising a fugitive core insert. As a further alternative, the airfoil 800 including the dust tolerant cooling system 802 may be formed using other additive manufacturing processes, including, but not limited to, direct metal laser sintering, electron-beam melting, binder jet printing, etc. This process may be repeated to form a plurality of the airfoils 800. With the plurality of airfoils 800 formed, the airfoils 800 may be positioned in an annular array. The outer platform 216 may be cast around the outer diameter or tip 226 of each of the airfoils 800 and the inner platform 814 may be cast around the inner diameter or root 228 of each of the airfoils 800. The outlet portion 838 may be defined in the inner platform 814 through the casting of the inner platform 814 using a suitable die, or may be defined by machining the inner platform 814 after casting. While the exemplary embodiment described herein employs a bi-cast or full-ring casting, it should be understood that the airfoil 800 and the cooling features 244, 344, 444, 606 may be formed as traditional cast segments such as doublets, triplets, or other numbers of airfoils per segment. In this example, the appropriate number of segments are then assembled to form the full turbine vane 808 assembly.

With the turbine vane 808 formed, the turbine vane 808 is installed into the gas turbine engine 100 (FIG. 1). In use, as the gas turbine engine 100 operates, the cooling fluid F is supplied to the first conduit 830 and the second conduit 732 through the outer platform inlet bore 234 and the second outer platform inlet bore 600, respectively. The cooling fluid F flows through the first conduit 830 along the leading edge 204, and the cooling features 244, 344, 444 cooperate to transfer heat from the leading edge 204 into the cooling fluid F. The cooling fluid F exits the first conduit 830 at the plurality of film cooling holes 850, thereby cooling the first platform surface 840 of the inner platform 814. The cooling fluid F that flows through the second conduit 732 cools the airfoil 800 downstream of the rib 260, 360 and may cooperate with the cooling features 606 to transfer heat into the cooling fluid F before the cooling fluid F exits the second conduit 732 along the trailing edge 224.

Figure 11:
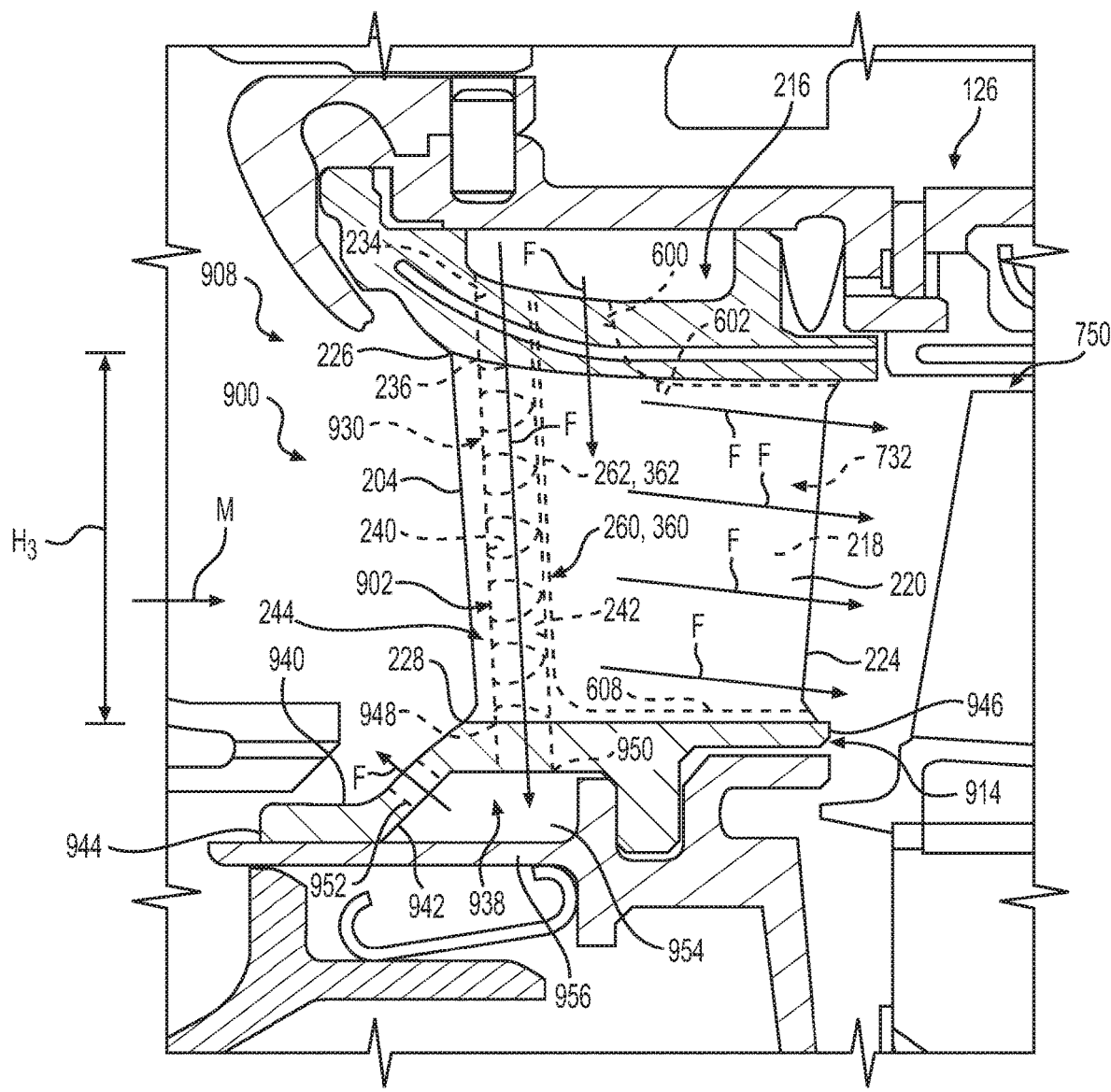
FIG. 11 is a detail cross-sectional view of the gas turbine engine of FIG. 1, taken at 2 of FIG. 1, which illustrates an exemplary turbine vane that includes another dust tolerant cooling system that is configured to cool a leading edge of an airfoil of the turbine vane while reducing the accumulation of fine sand and dust particles within the airfoil.

It will be understood that the turbine vane 208, the airfoil 200 and the dust tolerant cooling system 202 described with regard to FIGS. 1-8 may be configured differently to provide dust tolerant cooling to the leading edge 204. In one example, with reference to FIG. 11, an airfoil 900 with a dust tolerant cooling system 902 for use with a turbine vane 908 is shown. As the airfoil 900, the dust tolerant cooling system 902 and the turbine vane 908 include components that are substantially similar to or the same as the airfoil 200, the dust tolerant cooling system 202 and the turbine vane 208 discussed with regard to FIGS. 1-8 or the airfoil 700, the dust tolerant cooling system 702 and the turbine vane 708 discussed with regard to FIG. 9, the same reference numerals will be used to denote the same or similar features. The dust tolerant cooling system 902 may be employed with the turbine vane 908 to provide improved cooling along the leading edge 204 of the airfoil 900.

The turbine vane 908 includes a pair of opposing endwalls or platforms 914, 216, and the airfoils 900 are arranged in an annular array between the pair of opposing platforms 914, 216. The platforms 914, 216 have an annular or circular main or body section. The platforms 914, 216 are positioned in a concentric relationship with the airfoils 900 disposed in the radially extending annular array between the platforms 914, 216. In this example, the platform 216 is an outer platform and the platform 914 is an inner platform. The outer platform 216 circumscribes the inner platform 914 and is spaced therefrom to define a portion of the combustion gas flow path in the gas turbine engine 100. The plurality of airfoils 900 is generally disposed in the portion of the combustion gas flow path. In one example, the inner platform 914 is coupled to each of the airfoils 900 at an inner diameter, and the outer platform 216 is coupled to each of the airfoils 900 at an outer diameter.

Each of the airfoils 900 has the pressure sidewall 218 and the suction sidewall 220. The pressure and suction sidewalls 218, 220 interconnect the leading edge 204 and the trailing edge 224 of each airfoil 900. The airfoil 900 includes the tip 226 and the root 228, which are spaced apart by a height H3 of the airfoil 900 or in a spanwise direction. The tip 226 is at the outer diameter of the airfoil 900 and is coupled to the outer platform 216 and the root 228 is at the inner diameter and is coupled to the inner platform 914.

In one example, for each of the airfoils 900, the dust tolerant cooling system 902 is defined through the outer platform 216 and the inner platform 914 associated with the respective one of the airfoils 900, and a portion of the dust tolerant cooling system 902 is defined between the pressure and suction sidewalls 218, 220 of the respective airfoil 900. In this example, the dust tolerant cooling system 902 includes a first, leading edge conduit or first conduit 930 and the second conduit 732. The first conduit 930 is in fluid communication with the source of the cooling fluid F to cool the leading edge 204 of the airfoil 900, and the second conduit 732 is in fluid communication with the source of the cooling fluid F to cool the airfoil 900 downstream of the leading edge 204 to the trailing edge 224.

In one example, the first conduit 930 includes the outer platform inlet bore 234, the airfoil inlet 236, an outlet portion 938, the first surface 240, the second surface 242 and the plurality of cooling features 244 (FIG. 4). It should be noted that in certain embodiments, the airfoil 900 may include the plurality of cooling features 344 (FIG. 7), or the plurality of cooling features 444 (FIG. 8). The outer platform inlet bore 234 fluidly couples the source of the cooling fluid F to the airfoil inlet 236 to supply the first conduit 930 with the cooling fluid F. The airfoil inlet 236 is defined at the tip 226 so as to be positioned at the outer diameter and is in fluid communication with the outer platform inlet bore 234 to receive the cooling fluid F.

In one example, the outlet portion 938 is defined through the inner platform 914. In this regard, the inner platform 914 has a first platform surface 940 opposite a second platform surface 942, and a first platform end 944 opposite a second platform end 946. In this example, the outlet portion 938 includes an airfoil outlet 948, a first platform outlet 950 and a second platform outlet 952. The airfoil outlet 948 is defined through the root 228 of the airfoil 900 near the leading edge 204 and is in fluid communication with the first platform outlet 950. The first platform outlet 950 is defined through the first platform surface 940 and the second platform surface 942 between the first platform end 944 and the second platform end 946. The first platform outlet 950 is defined through a portion of the inner platform 914 that is coupled to the root 228 of the airfoil 900. The first platform outlet 950 is in fluid communication with a chamber 954 defined between the inner platform 914 and a structure 956 associated with the gas turbine engine 100. The second platform outlet 952 is defined through the first platform surface 940 and the second platform surface 942 between the first platform end 944 and the second platform end 946, and is upstream from the first platform outlet 950. The second platform outlet 952 is in fluid communication with the chamber 954 such that cooling fluid F flows from the airfoil 900 through the airfoil outlet 948, into the first platform outlet 950, into the chamber 954 and from the chamber 954, the cooling fluid F flows into the second platform outlet 952. From the second platform outlet 952, the cooling fluid F flows into the main fluid flow M or combustion gas flow upstream from the airfoil 900. Stated another way, the cooling fluid F flows from the second platform outlet 952 so as to be upstream from the leading edge 204 of the airfoil 900. By flowing into the main fluid flow M and mixing with the main fluid flow M, the cooling fluid F, which has a lower temperature, may help cool the first platform surface 940. In addition, the ejection of the cooling fluid F into the main fluid flow M does not cause loss of engine performance. In this regard, the cooling fluid F that exits the second platform outlet 952 is introduced upstream of a throat location for the turbine vane 208 and may be used by the downstream rotor blade row, which results in the cooling fluid F not being considered detrimental to the overall engine performance.

As the airfoil 900 and the dust tolerant cooling system 902 may be manufactured in the same manner as the airfoil 200 and the dust tolerant cooling system 202 discussed with regard to FIGS. 1-8, the manufacture of the airfoil 900 and the dust tolerant cooling system 902 will not be discussed in detail herein. Briefly, however, a core that defines the airfoil 900 including the respective cooling features 244, 344, 444, the first conduit 930 and the second conduit 732 (optionally with the second plurality of cooling features 606) is printed from a ceramic material, using ceramic additive manufacturing for example, and investment casting is performed to form the airfoil 900 including the integrally formed dust tolerant cooling system 902. Alternatively, the dust tolerant cooling system 902 may be formed in the airfoil 900 using conventional dies with one or more portions of the core (or portions adjacent to the core) comprising a fugitive core insert. As a further alternative, the airfoil 900 including the dust tolerant cooling system 902 may be formed using other additive manufacturing processes, including, but not limited to, direct metal laser sintering, electron-beam melting, binder jet printing, etc. This process may be repeated to form a plurality of the airfoils 900. With the plurality of airfoils 900 formed, the airfoils 900 may be positioned in an annular array. The outer platform 216 may be cast around the outer diameter or tip 226 of each of the airfoils 900 and the inner platform 914 may be cast around the inner diameter or root 228 of each of the airfoils 900. The outlet portion 938 may be defined in the inner platform 914 through the casting of the inner platform 914 using a suitable die, or may be defined by machining the inner platform 914 after casting. While the exemplary embodiment described herein employs a bi-cast or full-ring casting, it should be understood that the airfoil 900 and the cooling features 244, 344, 444, 606 may be formed as traditional cast segments such as doublets, triplets, or other numbers of airfoils per segment. In this example, the appropriate number of segments are then assembled to form the full turbine vane 908 assembly.

With the turbine vane 908 formed, the turbine vane 908 is installed into the gas turbine engine 100 (FIG. 1). In use, as the gas turbine engine 100 operates, the cooling fluid F is supplied to the first conduit 930 and the second conduit 732 through the outer platform inlet bore 234 and the second outer platform inlet bore 600, respectively. The cooling fluid F flows through the first conduit 930 along the leading edge 204, and the cooling features 244, 344, 444 cooperate to transfer heat from the leading edge 204 into the cooling fluid F. The cooling fluid F flows through the first platform outlet 950 and into the chamber 954. From the chamber 954, the cooling fluid F flows through the second platform outlet 952 and mixes with the main fluid flow M. The cooling fluid F that flows through the second conduit 732 cools the airfoil 900 downstream of the rib 260, 360 and may cooperate with the cooling features 606 to transfer heat into the cooling fluid F before the cooling fluid F exits the second conduit 732 along the trailing edge 224.

Thus, the dust tolerant cooling system 202, 702, 802, 902 connects the leading edge 204 of the airfoil 200 to the rib 260, 360, which is cooler than the leading edge 204 and enables a transfer of heat through the respective cooling features 244, 344, 444 and the cooling fluid F to cool the leading edge 204. Further, the cooling features 244, 344, 444 increase turbulence within the first conduit 230, 330, 430 by creating strong secondary flow structures due to the cooling features 244, 344, 444 traversing the first conduit 230, 330, 430 and extending between the first surface 240 and the second surface 242, 342. Moreover, the cross-sectional shape of the cooling features 244, 344, 444 reduces an accumulation of dust and fine particles within the first conduit 230, 330, 430 as the reduced diameter of the first pin end 270 minimizes an accumulation of sand and dust particles on the respective first surface 278. The first fillet 274 also increases vorticity in the cooling fluid F, which improves conduction from the leading edge 204 as the first fillet 274 drives the cooling fluid F toward the hot wall, or the first surface 240 opposite the leading edge 204 in this example. Further, the dust tolerant cooling system 202, 702, 802, 902 provides for additional cooling to the inner platform 214, 714, 814, 914. It should be noted that in certain embodiments, turbulators may be used in conjunction with the cooling features 244, 344, 444 of the respective dust tolerant cooling system 202, 702, 802, 902 on the first surface 240, and optionally, on the second surface 242, 342 to cool the leading edge 204.

Figure 12:
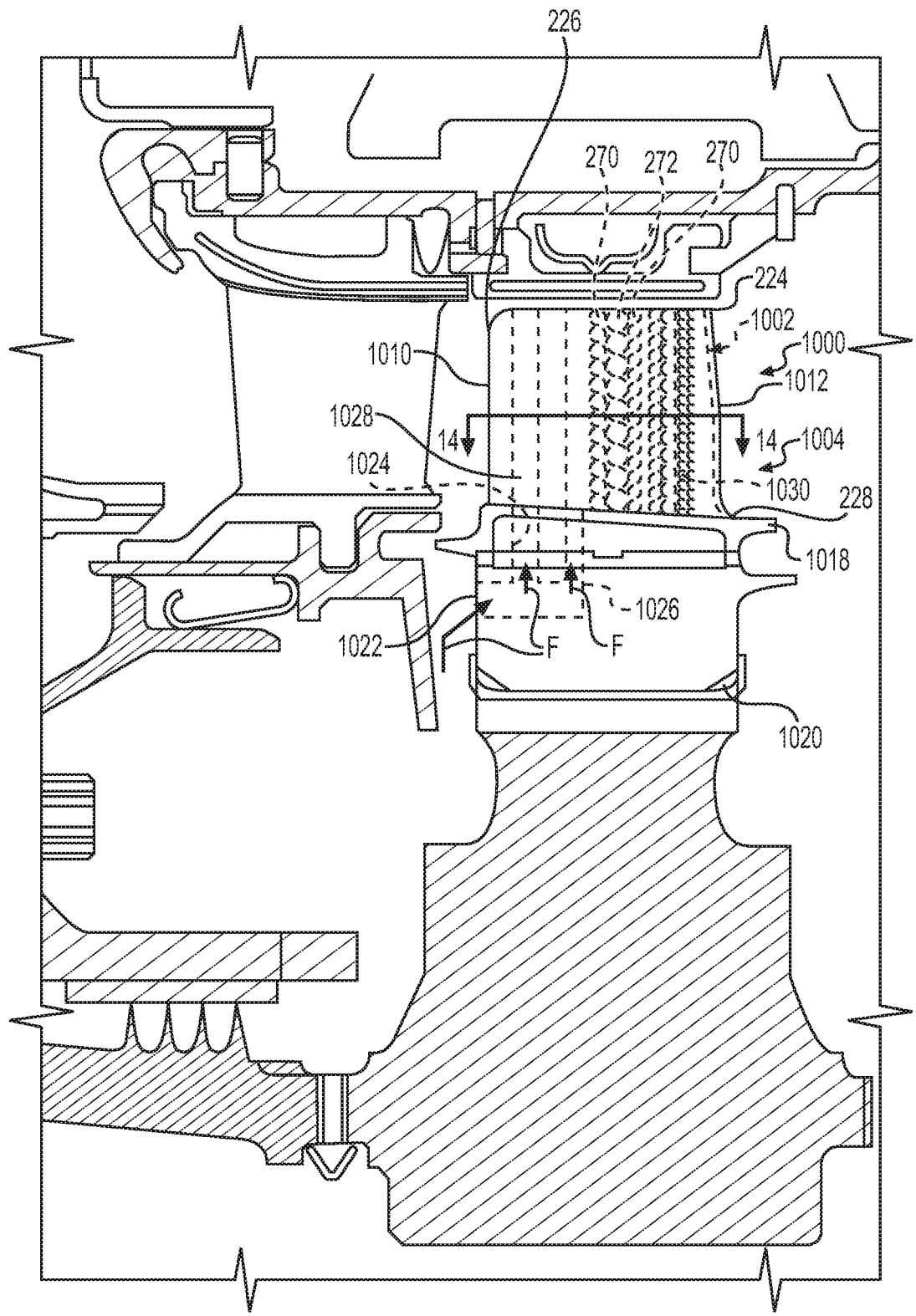
FIG. 12 is a detail cross-sectional view of the gas turbine engine of FIG. 1, taken at 2 of FIG. 1, which illustrates the turbine blade that includes the dust tolerant cooling system that is configured to cool a trailing edge of an airfoil of the turbine blade while reducing the accumulation of fine sand and dust particles within the airfoil.

It will be understood that the turbine vane 208, the airfoil 200 and the dust tolerant cooling system 202 described with regard to FIGS. 1-8 may be configured differently to provide dust tolerant cooling to the airfoil 200. With reference to FIG. 12, a portion of the high pressure turbine 126 of the gas turbine engine 100 of FIG. 1 is shown in greater detail. In this example, a dust tolerant cooling system 1002 is employed with an airfoil 1000 associated with a rotor blade structure 1004. As the airfoil 1000, the dust tolerant cooling system 1002 and the rotor blade structure 1004 include components that are substantially similar to or the same as the airfoil 200, the dust tolerant cooling system 202 and the turbine vane 208 discussed with regard to FIGS. 1-8, the same reference numerals will be used to denote the same or similar features. The dust tolerant cooling system 1002 may be employed with the rotor blade structure 1004 to provide improved cooling along the airfoil 1000.

Figure 13:
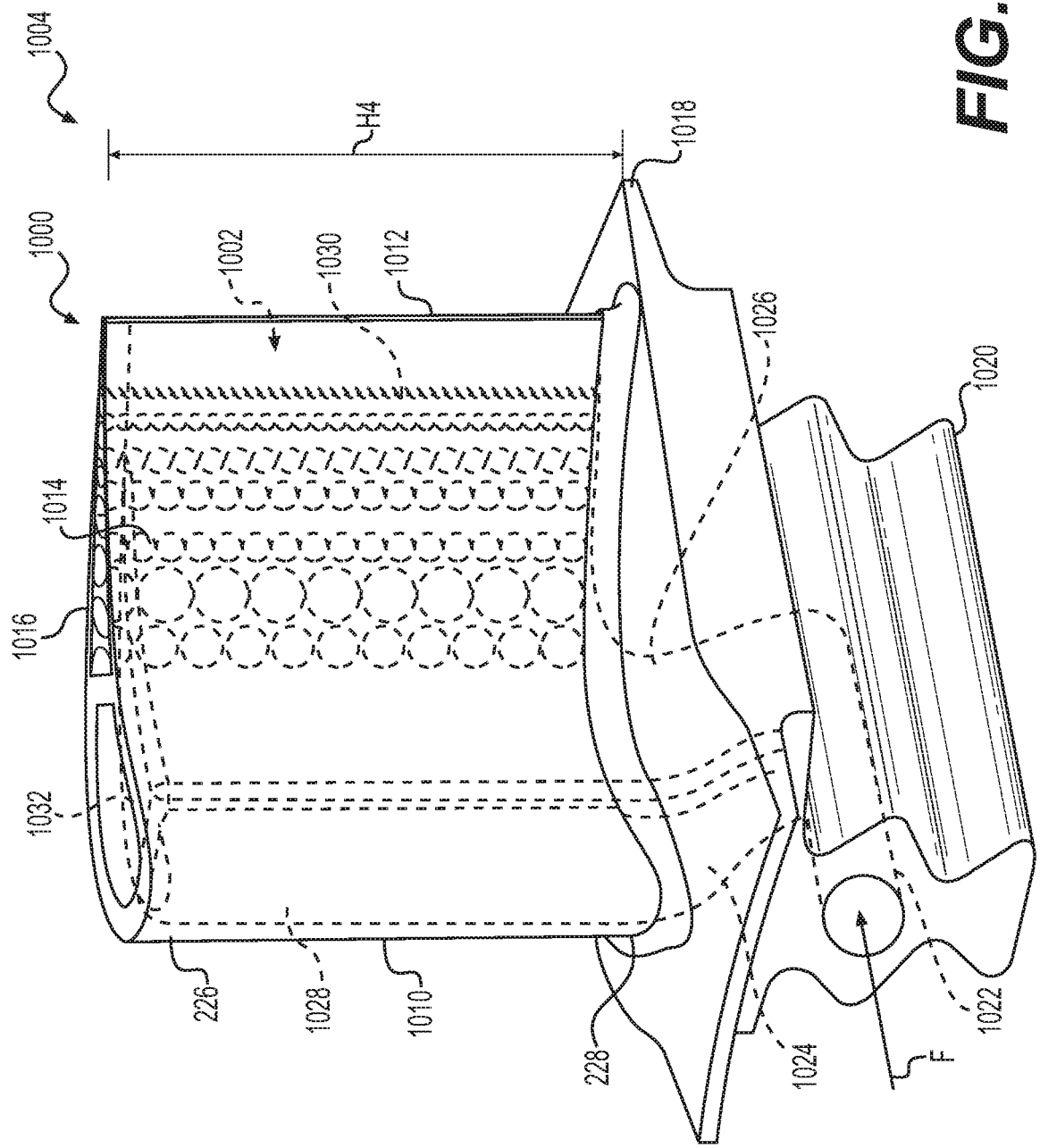
FIG. 13 is a perspective view of the turbine blade of FIG. 12.

With reference to FIG. 13, a perspective view of the rotor blade structure 1004 is shown. In this example, the airfoil 1000 is a turbine blade. The airfoil 1000 includes the tip 226 and the root 228, which are spaced apart for a height H4 or in a spanwise direction. The airfoil 1000 further includes a leading edge 1010, a trailing edge 1012, a pressure sidewall 1014, and an opposite suction sidewall 1016. The pressure and suction sidewalls 1014, 1016 extend from the leading edge 1010 to the trailing edge 1012. In the illustrated example, the rotor blade structure 1004 further includes a platform 1018 and a platform root 1020, which is partially shown and joined to the platform 1018 opposite the airfoil 1000. In certain embodiments, the rotor blade structure 1004 may be a discrete, insert-type blade piece, and the platform root 1020 may be imparted with an interlocking shape (e.g. fir-tree or dovetail) for mating insertion into a corresponding slot provided in a separately-fabricated rotor hub. In other embodiments, the rotor blade structure 1004 may assume various other forms such that the airfoil 1000 is integrally formed with or otherwise joined to a rotor hub as, for example, a bladed disk (blisk).

In this example, the dust tolerant cooling system 1002 is defined between the pressure and suction sidewalls 1014, 1016 between the leading edge 1010 and the trailing edge 1012 of the airfoil 1000. In this example, an inlet 1022 for an internal cooling channel is defined through the platform root 1020 at a front or near the leading edge 1010 of the airfoil 1000, such that the cooling fluid F is received into the airfoil 1000 from the root 228 near the leading edge 1010 of the airfoil 1000 (i.e. forward-fed airfoil). It should be noted, however, that the airfoil 1000 of the rotor blade structure 1004 may also be a bottom-fed airfoil, such that cooling fluid F is received through a passage defined in a bottom surface (e.g. a surface of the platform root 1020 opposite of the root 228 of the airfoil 1000). In addition, it should be noted that any number of cooling channels may be defined in the platform root 1020, and in this example, the inlet 1022 of the platform root 1020 is in communication with an internal first or leading edge cooling supply channel 1024 and an internal second or trailing edge cooling supply channel 1026, which are each defined through the platform root 1020. The leading edge cooling supply channel 1024 is defined to communicate the cooling fluid F from the inlet 1022 to a first, leading edge conduit or first conduit 1028 associated with the airfoil 1000, and the trailing edge cooling supply channel 1026 is defined to communicate the cooling fluid F from the inlet 1022 to a second, trailing edge conduit or second conduit 1030 associated with the airfoil 1000. In this example, as will be discussed, the dust tolerant cooling system 1002 is defined in the second conduit 1030 to enhance heat transfer between the pressure sidewall 1014 and the suction sidewall 1016, while reducing the accumulation of dust and fine particles within the airfoil 1000.

Figure 14:
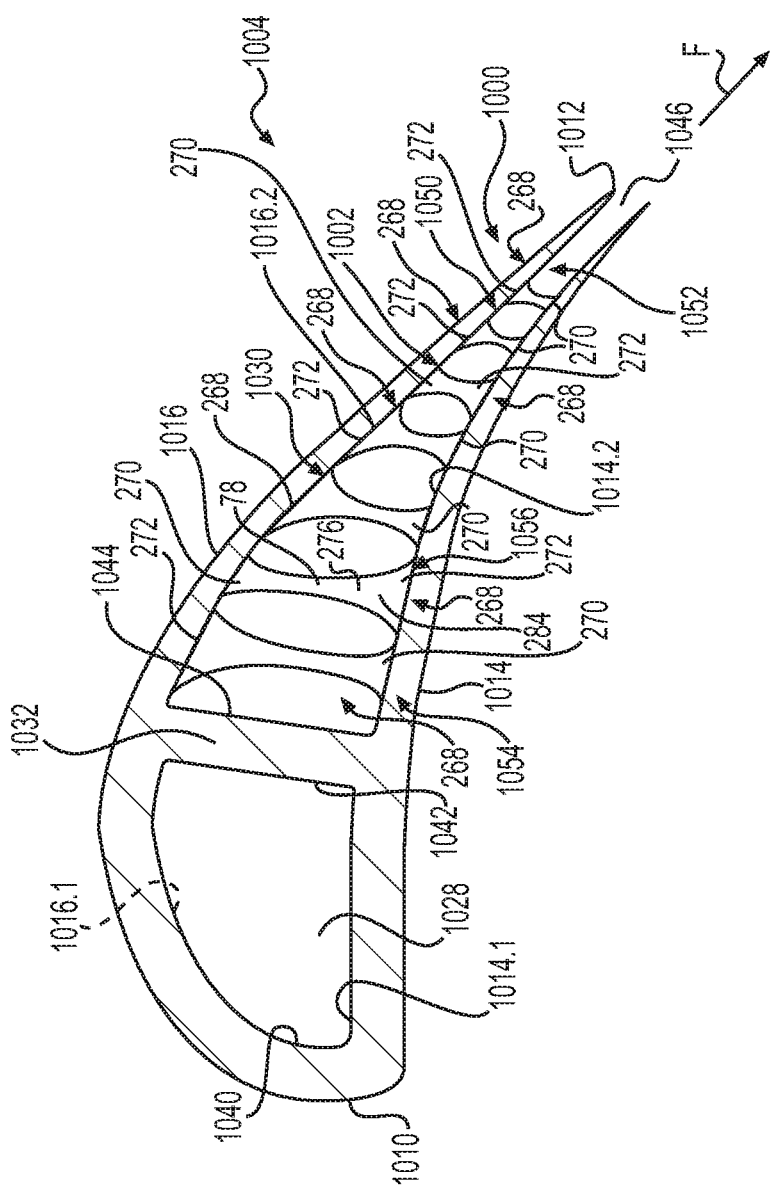
FIG. 14 is a cross-sectional view taken along line 14-14 of FIG. 12, which illustrates an exemplary plurality of cooling features associated with the dust tolerant cooling system of the turbine blade in accordance with various embodiments.

The dust tolerant cooling system 1002 is shown in greater detail in FIG. 14, looking radially inward into the airfoil 1000. In this example, the airfoil 1000 defines, between the pressure and suction sidewalls 1014, 1016, the first conduit 1028 and the second conduit 1030. It should be understood that the airfoil 1000 may define any number of conduits. The first conduit 1028 is defined between the pressure and suction sidewalls 1014, 1016 to be at, next to or adjacent to the leading edge 1010, while the second conduit 1030 is defined between the pressure and suction sidewalls 1014, 1016 so as to be at, next or adjacent to the trailing edge 1012. In this example, a rib 1032 separates the first conduit 1028 from the second conduit 1030. Thus, in this example, the first conduit 1028 extends from a first surface 1040 opposite the leading edge 1010 to a second surface 1042 defined along the rib 1032 over the height H4 of the airfoil 1000. The first conduit 1028 further extends from an inner surface 1014.1 of the pressure sidewall 1014 to an inner surface 1016.1 of the suction sidewall 1016. The first conduit 1028 is in fluid communication with the internal leading edge cooling supply channel 1024 of the rotor blade structure 1004 to receive the cooling fluid F into the airfoil 1000. It should be noted that although not shown herein, the first conduit 1028 may include one or more of the cooling features 244, 344, 444 traversing the first conduit 1028.

The second conduit 1030 extends from a third surface 1044 defined along the rib 1032 opposite the second surface 1042 to the trailing edge 1012 over the height H4 of the airfoil 1000. In this example, the trailing edge 1012 defines at least one or a plurality of trailing edge slots 1046, and the second conduit 1030 terminates at the trailing edge slots 1046. The second conduit 1030 further extends from a second inner surface 1014.2 of the pressure sidewall 1014 to a second inner surface 1016.2 of the suction sidewall 1016. The second conduit 1030 is in fluid communication with the internal trailing edge cooling supply channel 1026 of the rotor blade structure 1004 to receive the cooling fluid F into the airfoil 1000. The dust tolerant cooling system 1002 spans the second conduit 1030 from the third surface 1044 to the trailing edge 1012 along the height H4 of the airfoil 1000.

The plurality of cooling features 1050 are arranged in sub-pluralities or rows 1052 that are spaced apart radially relative to the longitudinal axis 140 of the gas turbine engine 10 from the root 228 to the tip 226 of the airfoil 200 (FIG. 12). Depending on the size of the rotor blade structure 1004, the number of rows 1052 of the cooling features 1050 may be between about 4 to about 20. In other embodiments, the number of rows of cooling features 1050 may be greater than about 20 or less than about 4. The sub-pluralities of the plurality of cooling features 1050 are spaced apart radially in the rows 1052 along the height H4 (FIG. 13) of the airfoil 1000 within the second conduit 1030 (FIG. 13). As shown in FIG. 14, in one example, each row 1052 of the plurality of cooling features 1050 includes a plurality of the cooling pins 268. Each of the cooling pins 268 extends from the second surface 1016.2 of the suction sidewall 1016 to the second surface 1014.2 of the pressure sidewall 1014 to facilitate convective heat transfer between the cooling fluid F, the pressure sidewall 1014 and the suction sidewall 1016, while reducing an accumulation of dust and fine particles. In this example, each row 1052 includes a first subset 1054 of the cooling pins 268 and a second subset 1056 of the cooling pins 268. As the cooling pins 268 associated with the second conduit 1030 are the same as the cooling pins 268 discussed with regard to FIGS. 1-8 except for the orientation of the cooling pins 268 within the second conduit 1030, the cooling pins 268 will not be discussed in detail herein. Briefly, however, each of the cooling pins 268 includes the first pin end 270, and the opposite second pin end 272. In this example, the cooling pins 268 have an alternating arrangement within the second conduit 1030. The exact configuration of the alternating arrangement is predetermined by utilizing heat transfer analysis to optimize the specific configuration based on local heat loading on the second surface 1016.2 of the suction sidewall 1016 and based on the local heat loading on the second surface 1014.2 of the pressure sidewall 1014. In this example, the cooling pins 268 associated with the second subset 1056 have the first pin end 270 coupled to or integrally formed with the second surface 1016.2 of the suction sidewall 1016 and the second pin end 272 coupled to or integrally formed with the second surface 1014.2 of the pressure sidewall 1014. The cooling pins 268 associated with the first subset 1054 have the first pin end 270 coupled to or integrally formed with the second surface 1014.2 of the pressure sidewall 1014 and the second pin end 272 coupled to or integrally formed with the second surface 1016.2 of the suction sidewall 1016.

Each of the cooling pins 268 associated with the forward-fed rotor blade structure 1004 includes the first fillet 274, which is defined along the first surface 278 (FIG. 5) of the cooling pin 268, and the second fillet 276, which is defined along the opposite, second surface 280 of the cooling pin 268. As discussed, the first fillet 274 is defined along the first surface 278 at the second pin end 272 to extend toward the first pin end 270, and has a greater fillet arc than the second fillet 276. The second fillet 276 is defined along the second surface 280 at the second pin end 272 to extend toward the first pin end 270. In addition, the small fillets 275 are also employed on the first pin end 270 to minimize stress concentrations at the interface between the cooling pin 268 and the respective one of the second surface 1016.2 or the second surface 1014.2. By providing the first fillet 274 with a larger fillet arc at the second pin end 272, vorticity in the cooling fluid F is increased and conduction from the pressure sidewall 1014 and the suction sidewall 1016 is improved. For each of the cooling pins 268, the first surface 278 is upstream from the second surface 280 in the cooling fluid F. The first surface 278 faces the trailing edge cooling supply channel 1026 (FIG. 13) so as to be positioned upstream in the cooling fluid F.

Stated another way, as the cooling fluid F enters the airfoil 1000 from the inlet 1022 (FIG. 12) and flows from the root 228 to the tip 226 (FIG. 13), each of the cooling pins 268 is orientated such that the first surface 278 faces the trailing edge cooling supply channel 1026 and the first fillet 274 remains upstream in the cooling fluid F. Thus, the cooling pins 268 of FIG. 14 are orientated between about 90 degrees and about 180 degrees from the cooling pins 268 shown in FIG. 5 such that the first fillet 274 remains upstream from the second fillet 276 in the direction of the cooling fluid F flow through the airfoil 1000. Note that for illustration purposes, cooling fluid F is represented as flowing axially outward in FIG. 14. In embodiments with a flow direction that is not radial, such as for example, a substantially chordwise flow direction from third surface 1044 to trailing edge slots 1046, each of the cooling pins 268 is orientated such that the first surface 278 faces the oncoming cooling fluid F, and the first fillet 274 remains upstream from the second fillet 276. For flow directions that are neither purely radial nor purely chordwise, a fluid mechanics analysis is similarly performed, and each cooling pins 268 is oriented along the flow direction of cooling fluid F such that the first surface 278 faces the oncoming cooling fluid F, and the first fillet 274 remains upstream from the second fillet 276. This results in a pin configuration that minimizes the accumulation of sand and fine particles that may impact heat transfer performance.

Figure 15:
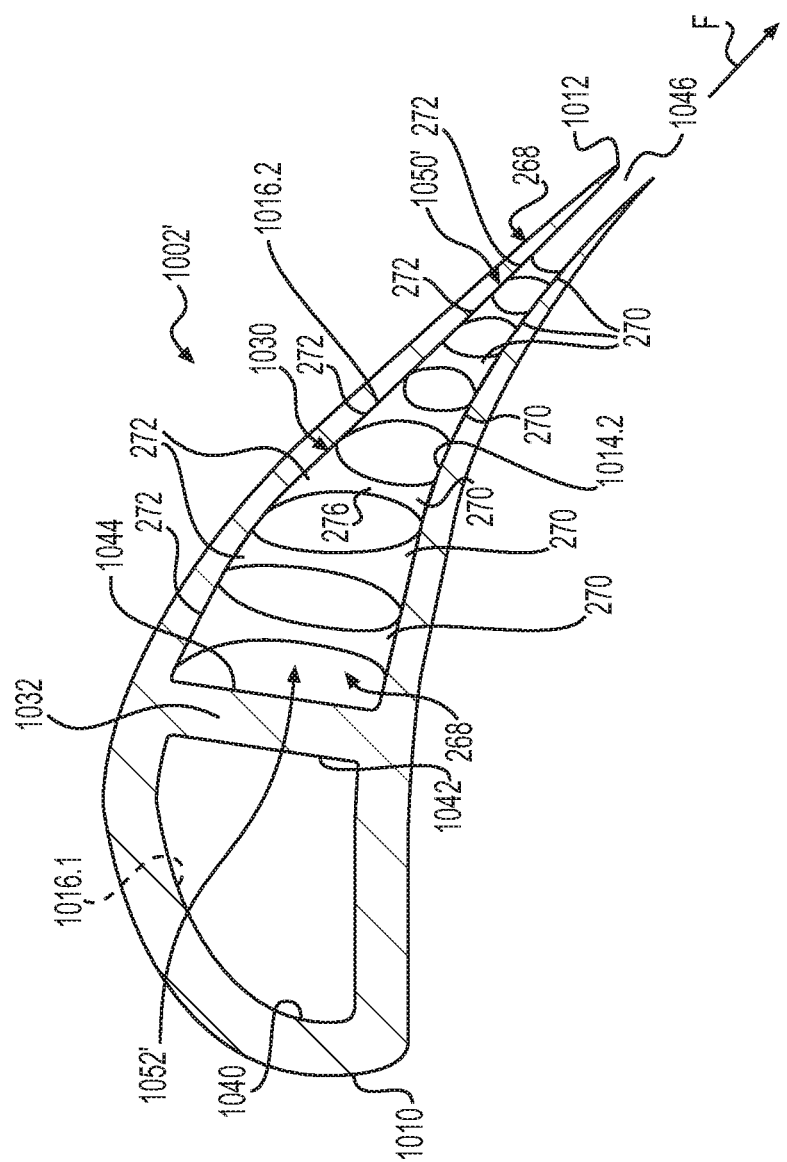
FIG. 15 is a cross-sectional view taken along line 14-14 of FIG. 12, which illustrates an exemplary plurality of cooling features associated with the dust tolerant cooling system of the turbine blade in accordance with various embodiments.

It will be understood that the dust tolerant cooling system 1002 may be configured differently to provide dust tolerant cooling to the airfoil 1000. With reference to FIG. 15, a dust tolerant cooling system 1002' is shown, looking radially inward into the airfoil 1000. The dust tolerant cooling system 1002' spans the second conduit 1030 from the third surface 1044 to the trailing edge 1012 along the height H4 of the airfoil 1000 (FIG. 13). In this example, a plurality of cooling features 1050' are arranged in sub-pluralities or rows 1052' that are spaced apart radially relative to the longitudinal axis 140 of the gas turbine engine 10 from the root 228 to the tip 226 of the airfoil 200 (FIG. 2). Depending on the size of the rotor blade structure 1004, the number of rows 1052' of the cooling features 1050' may be between about 4 to about 20. In other embodiments, the number of rows of cooling features 1050' may be greater than about 20 or less than about 4. The sub-pluralities of the plurality of cooling features 1050' are spaced apart radially in the rows 1052 along the height H4 (FIG. 13) of the airfoil 1000 within the second conduit 1030 (FIG. 13). As shown in FIG. 14, in one example, each row 1052' of the plurality of cooling features 1050' includes a plurality of the cooling pins 268. Each of the cooling pins 268 extends from the second surface 1016.2 of the suction sidewall 1016 to the second surface 1014.2 of the pressure sidewall 1014 to facilitate convective heat transfer between the cooling fluid F, the pressure sidewall 1014 and the suction sidewall 1016, while reducing an accumulation of dust and fine particles. As the cooling pins 268 associated with the second conduit 1030 are the same as the cooling pins 268 discussed with regard to FIGS. 1-8 except for the orientation of the cooling pins 268 within the second conduit 1030, the cooling pins 268 will not be discussed in detail herein. Briefly, however, each of the cooling pins 268 includes the first pin end 270, and the opposite second pin end 272. In this example, the cooling pins 268 are orientated in the same direction within the second conduit 1030. In this example, the cooling pins 268 have the first pin end 270 coupled to or integrally formed with the second surface 1014.2 of the pressure sidewall 1014 and the second pin end 272 coupled to or integrally formed with the second surface 1016.2 of the suction sidewall 1016. It should be noted that depending upon the heat loading of the suction sidewall 1016, in other embodiments not shown herein, the cooling pins 268 may be reversed with the second pin end 272 coupled to or integrally formed with the second surface 1014.2 of the pressure sidewall 1014 and the first pin end 270 coupled to or integrally formed with the second surface 1016.2 of the suction sidewall 1016.

Each of the cooling pins 268 associated with the forward-fed rotor blade structure 1004 includes the first fillet 274, which is defined along the first surface 278 (FIG. 5) of the cooling pin 268, and the second fillet 276, which is defined along the opposite, second surface 280 of the cooling pin 268. As discussed, the first fillet 274 is defined along the first surface 278 at the second pin end 272 to extend toward the first pin end 270, and has a greater fillet arc than the second fillet 276. The second fillet 276 is defined along the second surface 280 at the second pin end 272 to extend toward the first pin end 270. In addition, the small fillets 275 are also employed on the first pin end 270 to minimize stress concentrations at the interface between the cooling pin 268 and the respective one of the second surface 1016.2 or the second surface 1014.2. By providing the first fillet 274 with a larger fillet arc at the second pin end 272, vorticity in the cooling fluid F is increased and conduction from the pressure sidewall 1014 and the suction sidewall 1016 is improved. For each of the cooling pins 268, the first surface 278 is upstream from the second surface 280 in the cooling fluid F. The first surface 278 faces the trailing edge cooling supply channel 1026 (FIG. 13) so as to be positioned upstream in the cooling fluid F.

Stated another way, as the cooling fluid F enters the airfoil 1000 from the inlet 1022 (FIG. 12) and flows from the root 228 to the tip 226 (FIG. 13), each of the cooling pins 268 is orientated such that the first surface 278 faces the trailing edge cooling supply channel 1026 and the first fillet 274 remains upstream in the cooling fluid F. Thus, the cooling pins 268 of FIG. 15 are orientated about 90 degrees to about 180 degrees from the cooling pins 268 shown in FIG. 5 such that the first fillet 274 remains upstream from the second fillet 276 in the direction of the cooling fluid F flow through the airfoil 1000. Note that for illustration purposes, cooling fluid F is represented as flowing axially outward in FIG. 15. In embodiments with a flow direction that is not radial, such as for example, a substantially chordwise flow direction from third surface 1044 to trailing edge slots 1046, each of the cooling pins 268 is orientated such that the first surface 278 faces the oncoming cooling fluid F, and the first fillet 274 remains upstream from the second fillet 276. For flow directions that are neither purely radial nor purely chordwise, a fluid mechanics analysis is similarly performed, and each cooling pins 268 is oriented along the flow direction of cooling fluid F such that the first surface 278 faces the oncoming cooling fluid F, and the first fillet 274 remains upstream from the second fillet 276. This results in a pin configuration that minimizes the accumulation of sand and fine particles that may impact heat transfer performance.

Thus, the airfoil 1000 may be manufactured with the dust tolerant cooling system 1002 or the dust tolerant cooling system 1002'. As the airfoil 1000 and the dust tolerant cooling system 1002, 1002' may be manufactured in the same manner as the airfoil 200 and the dust tolerant cooling system 202 discussed with regard to FIGS. 1-8, the manufacture of the airfoil 1000 and the dust tolerant cooling system 1002 will not be discussed in detail herein. Briefly, however, a core that defines the airfoil 1000 including the cooling features 1050, 1050', the first conduit 1028 and the second conduit 1030 is printed from a ceramic material, using ceramic additive manufacturing for example, and investment casting is performed to form the airfoil 1000 including the integrally formed dust tolerant cooling system 1002, 1002'. Alternatively, the dust tolerant cooling system 1002, 1002' may be formed in the airfoil 1000 using conventional dies with one or more portions of the core (or portions adjacent to the core) comprising a fugitive core insert. As a further alternative, the airfoil 1000 including the dust tolerant cooling system 1002, 1002' may be formed using other additive manufacturing processes, including, but not limited to, direct metal laser sintering, electron-beam melting, binder jet printing, etc. The airfoil 1000 may be manufactured such that the platform 1018 and/or platform root 1020 (FIG. 13) is integrally formed with the airfoil 1000.

The above process may be repeated to form a plurality of the rotor blade structures 1004. With the plurality of rotor blade structures 1004 formed, the rotor blade structures 1004 may be coupled to a hub, via the platform root 1020, to form a turbine rotor of the high pressure turbine 126 (FIG. 2). Thus, in this example, the airfoil 1000 including the dust tolerant cooling system 1002, 1002' is a turbine blade. With the turbine rotor formed, the turbine rotor is installed into the gas turbine engine 100 (FIG. 1). In use, with reference to FIG. 13, as the gas turbine engine 100 operates, the cooling fluid F is supplied to the leading edge cooling supply channel 1024 and the trailing edge cooling supply channel 1026 through the inlet 1022. In the example of the leading edge cooling supply channel 1024, the cooling fluid F flows through the leading edge cooling supply channel 1024 and into the first conduit 1028 to cool the leading edge 1010. In the example of the trailing edge cooling supply channel 1026, the cooling fluid F flows through the trailing edge cooling supply channel 1026 and into the second conduit 1030. As the cooling fluid F flows through the second conduit 1030, the cooling features 1050, 1050' cooperate to transfer heat from the pressure sidewall 1014 and the suction sidewall 1016 into the cooling fluid F while reducing an accumulation of fine sand and dust particles within the second conduit 1030. The cooling fluid F flows from the second conduit 1030 through the trailing edge slots 1046 (FIG. 14). By employing the cooling pins 268 within the second conduit 1030, a longevity of the rotor blade structure 1004 is improved through the reduction in the accumulation of fine sand and dust particles within the airfoil 1000.

It should be noted that while the cooling features 244, 344, 444 are described for use with the airfoil 200, one or more of the cooling features 244, 344, 444 may be employed to cool the leading edge 1010 of the airfoil 1000. Further, the airfoil 200 may include the cooling features 1050, 1050' defined within the second conduit 232, 732 of the airfoil 200 to promote heat transfer within the second conduit 232, 732, if desired. In addition, it should be noted that the use of the cooling pins 268, 350 with the dust tolerant cooling systems

202, 702, 802, 902, 1002, 1002' results in an increase of about 2% in heat transfer, reduces pressure drop by about 9% and reduces the accumulation of sand and fine dust particles by about 28% when compared to a cylindrical pin.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbine component, comprising:
    a hot wall;
    a cold wall spaced apart from the hot wall;
    a conduit defined between the hot wall and the cold wall; and
    a cooling system defined in the conduit between the hot wall and the cold wall, the cooling system including a plurality of cooling pins, each cooling pin of the plurality of cooling pins comprising a first end having a first cross-sectional area, a second end having a second cross-sectional area, the first cross-sectional area less than the second cross-sectional area, and a body extending between the first end and the second end, with a pin leading edge defined along the body from the first end to the second end, the pin leading edge opposite a pin trailing edge, the pin leading edge defined by a first diameter and the pin trailing edge defined by a second diameter, the second diameter greater than the first diameter, with at least one first cooling pin of the plurality of cooling pins having the first end coupled to the hot wall and the second end coupled to the cold wall with a fillet.

2. The turbine component of claim 1, wherein the turbine component has a pressure side opposite a suction side, a rib that extends between the pressure side and the suction side and the cold wall is defined by the rib.

3. The turbine component of claim 1, wherein at least one second pin of the plurality of cooling pins has the second end coupled to the hot wall with the fillet and the first end coupled to the cold wall.

4. The turbine component of claim 1, wherein each of the plurality of cooling pins has the first end coupled to the hot wall and the second end coupled to the cold wall with the fillet.

5. The turbine component of claim 1, wherein the fillet further comprises a first fillet defined along the leading edge and a second fillet defined along the trailing edge, and a first fillet arc of the first fillet is greater than a second fillet arc of the second fillet.

6. The turbine component of claim 1, wherein the turbine component comprises an airfoil that extends from an inner diameter to an outer diameter and from a leading edge to a trailing edge, with an inner platform coupled to the airfoil at the inner diameter, the conduit is in proximity to the leading edge to cool the leading edge, the conduit having an inlet at the outer diameter to receive a cooling fluid and an outlet portion that is defined at least partially through the inner platform, the hot wall of the conduit opposite the leading edge, and the cooling system further comprises a second conduit to cool the trailing edge.

7. The turbine component of claim 6, wherein the outlet portion includes at least one outlet in fluid communication with the second conduit.

8. The turbine component of claim 6, wherein the outlet portion is in fluid communication with a plurality of film cooling holes defined through a portion of the inner platform that spans between the airfoil and a second airfoil, the second airfoil coupled to the inner platform and spaced apart from the airfoil.

9. The turbine component of claim 6, wherein downstream from the inner platform, the outlet portion is defined through a portion of the airfoil such that the outlet portion is in fluid communication with the trailing edge.

10. The turbine component of claim 1, wherein the plurality of cooling pins includes a first pair of the plurality of cooling pins extending substantially along a first longitudinal axis and having the first end of each of the first pair of the plurality of cooling pins coupled to the hot wall and the second end of each of the first pair of the plurality of cooling pins coupled to the cold wall, and a second pair of the plurality of cooling pins, with at least one second pin of the second pair of the plurality of cooling pins having a third end coupled to the hot wall and a fourth end coupled to the cold wall such that the fourth end is offset from an axis that extends through the third end of the at least one second pin of the second pair of the plurality of cooling pins and the third end has a greater cross-sectional area than the fourth end.

11. The turbine component of claim 1, wherein the cooling system further comprises a rib that extends from the hot wall to the cold wall to divide the conduit into a plurality of flow passages.

12. A turbine component, comprising:
    an airfoil having a pressure side opposite a suction side and a rib that extends between the pressure side and the suction side;
    a hot wall;
    a cold wall spaced apart from the hot wall defined by the rib;
    a conduit defined in the airfoil between the hot wall and the cold wall; and
    a cooling system defined in the conduit between the hot wall and the cold wall, the cooling system including a plurality of cooling pins, each cooling pin of the plurality of cooling pins comprising a first end having a first cross-sectional area, a second end having a second cross-sectional area, the first cross-sectional area less than the second cross-sectional area, and a body extending between the first end and the second end, with a pin leading edge defined along the body from the first end to the second end, the pin leading edge opposite a pin trailing edge, the pin leading edge defined by a first diameter and the pin trailing edge defined by a second diameter, the second diameter greater than the first diameter, with at least one first cooling pin of the plurality of cooling pins having the first end coupled to the hot wall and the second end coupled to the cold wall with a fillet.

13. The turbine component of claim 12, wherein at least one second pin of the plurality of cooling pins has the second end coupled to the hot wall with the fillet and the first end coupled to the cold wall.

* * * * *